(12) United States Patent
Namihira

(10) Patent No.: US 7,409,458 B2
(45) Date of Patent: Aug. 5, 2008

(54) NETWORK SYSTEM WITH SHARED FILTERING INFORMATION

(75) Inventor: Daisuke Namihira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 928 days.

(21) Appl. No.: 10/888,927

(22) Filed: Jul. 12, 2004

(65) Prior Publication Data
US 2005/0204059 A1 Sep. 15, 2005

(30) Foreign Application Priority Data
Mar. 12, 2004 (JP) ............................ 2004-069986

(51) Int. Cl.
G06F 15/173 (2006.01)
G06F 15/16 (2006.01)
H04L 9/00 (2006.01)
H04J 3/16 (2006.01)

(52) U.S. Cl. ........................ 709/238; 709/245; 709/228; 709/203; 713/151; 370/466

(58) Field of Classification Search ................ 709/238, 709/245, 228, 203; 713/151; 370/466
See application file for complete search history.

(56) References Cited

U.S. PATENT DOCUMENTS

| 2002/0062388 | A1* | 5/2002 | Ogier et al. | 709/238 |
| 2002/0083175 | A1* | 6/2002 | Afek et al. | 709/225 |
| 2003/0200463 | A1* | 10/2003 | McCabe | 713/201 |

FOREIGN PATENT DOCUMENTS

| JP | 11-027270 | 1/1999 |
| JP | 2001-510603 | 7/2001 |
| JP | 2002-281093 | 9/2002 |
| WO | 98/26552 | 6/1998 |

* cited by examiner

Primary Examiner—Kenny Lin
Assistant Examiner—Kishin G. Belani
(74) Attorney, Agent, or Firm—Hanify & King, P.C.

(57) ABSTRACT

A network system comprising a transmission medium coupling a plurality of devices on the network, a plurality of relay devices connected to the transmission medium, each relay device operable to apply filtering on data from the network and transmits frames, each relay device comprising command process division operable to generate and parse commands that include filtering information relating the sharing of filtering information on the network, and when filtering sharing conditions are applied, register filtering information on its own device and apply a protocol to relay to an adjacent device if filtering information sent from an adjacent device through the filtering sharing conditions has a destination address, if a port that received the filtering information from the adjacent matches a relay destination port of the destination address, and if there is only one relay destination port for the destination address, register a receiving port of the filtering information as a destination port, if there is no destination address information in the filtering information sent from the adjacent device through the filtering sharing conditions, and a filtering information sharing protocol division operable to apply a protocol so that filtering information is not relayed to an adjacent device, and a filtering division operable to relay filtering information and frames, or filters discarded information, based on instruction from the filtering information sharing protocol division.

31 Claims, 22 Drawing Sheets

C1 REGISTRATION

C3 HELLO

C4 SHUTDOWN

Fig. 7

| Identification Header Type Value | Identification Header Type |
|---|---|
| 0x0000 | Ethernet(MAC) |
| 0x1000 | IPv4 |
| 0x1001 | IPv6 |
| 0x2000 | TCP |
| 0x2001 | UDP |

Fig. 8

| Field Type Value | Field Type |
|---|---|
| 0 | Version |
| 1 | Internet Header Length |
| 2 | Type of Service |
| 3 | Total Length |
| 4 | Identification |
| 5 | Don't Fragment |
| 6 | More Fragment |
| 7 | Fragment Offset |
| 8 | Time To Live |
| 9 | Protocol |
| 10 | Header Checksum |
| 11 | Source Address |
| 12 | Destination Address |

Fig. 19
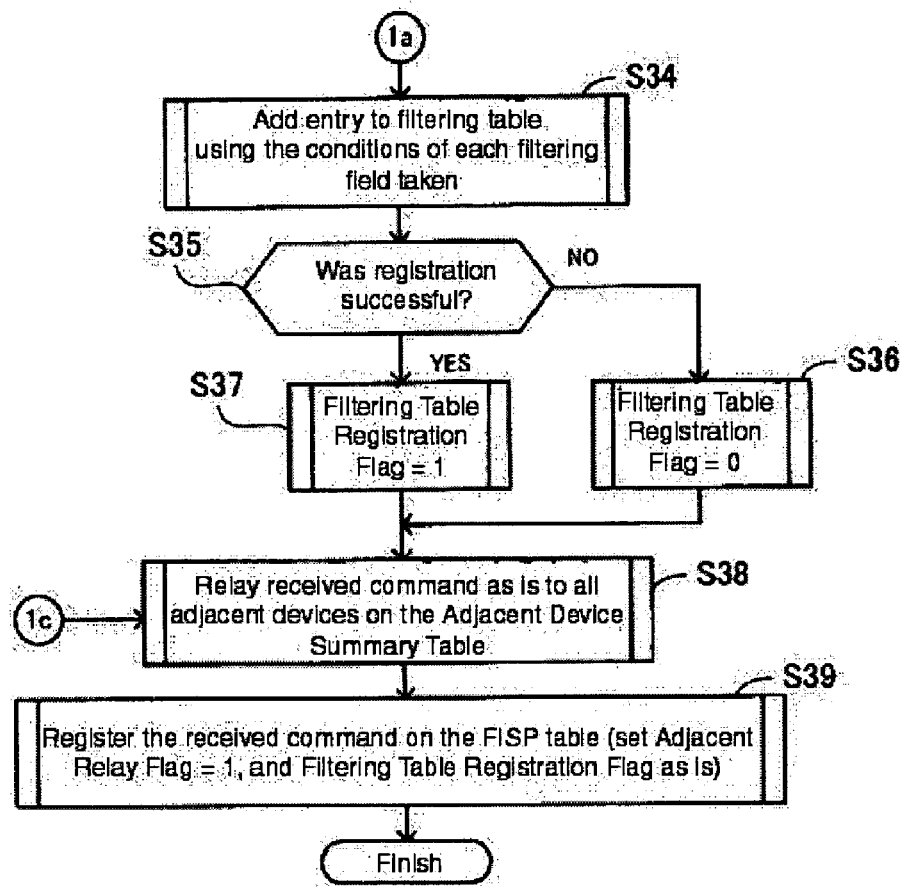
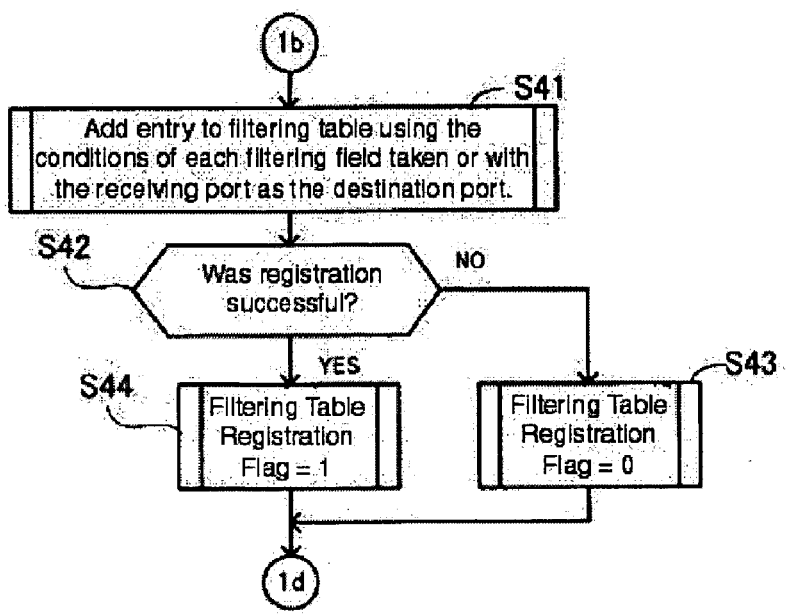

NETWORK SYSTEM WITH SHARED FILTERING INFORMATION

BACKGROUND OF THE INVENTION

1. Field of the Invention

This invention is related to network systems, particularly network systems that transmit frames after applying filtering on a network.

2. Background of the Prior Art

Currently, corporate networks are vulnerable to threats such as unauthorized access. Such threats are not limited to corporate networks, as web servers and FTP (File Transfer Protocol) servers that exist on a network and implement information transferring services are also vulnerable. Networks need to prevent unauthorized access and the destruction of internal data by deploying a firewall, or setting up a protective mechanism on relaying devices such as routers or switches.

Mechanisms that protect against unauthorized access generally use a filtering function. This function is structured to ensure security by examining frames sent through the network, determining whether to permit access, and then discarding frames that have been denied access. Filtering can also lighten traffic, since unnecessary frames will not be relayed.

Until now, filtering methods set up filtering individually for each device, so the filtering function is only effective on the device to which it was set. In other words, filtering processes are run on the set device only when a frame arrives.

Also, on servers such as web servers, filtering methods are set through a server application that determines access and discards unnecessary frames if access restrictions apply.

Filtering technology on networks involving an exchange of filtering table information between devices and a subsequent lightening of the network's load is currently recommended. (For example, see Japanese Unexamined Patent Application Publication H11-27270 Official Bulletin (Paragraph numbers (0008)~(0013), FIG. 1).

As mentioned above, if filtering is set up on a relay device in a network, the filtering is only effective on that particular device, and does not run until a frame to be filtered arrives to that device. Thus, frames will be relayed through the network until they arrive at that particular device even if they are frames to be discarded, causing an excess load problem.

FIG. 23 shows a sample network that explains the problem with current filtering methods. Note the device connection relationship within Network 200, and how Subnet 51 is connected to Server 80, Computer Terminal 71, and Relay Device 61. Relay Device 61 is connected to Relay Devices 62 and 63. Relay Device 62 is connected to Relay Devices 63 and 64, and Subnet 52, and Subnet 52 is connected to Computer Terminal 72.

Relay Device 63 is connected to Relay Device 65 and Subnet 53, and Subnet 53 is connected to Computer Terminal 73. Relay Device 64 is connected to Subnet 54, and Subnet 54 is connected to Computer Terminal 74. Relay Device 65 is connected to Relay Device 66 and Subnet 55, and Subnet 55 is connected to Computer Terminal 75. Relay Device 66 is connected to Subnet 56, and Subnet 56 is connected to Computer Terminal 76.

Let us propose that filtering is set up on Relay Device 63 to filter access to Server 80 from Computer Terminals 73, 75, and 76. In this situation, access from Computer Terminal 75 to Server 80 would be relayed by Relay Device 65, and access from Computer Terminal 76 to Server 80 would be relayed by Relay Devices 66 and 65, but since filtering is run on Relay Device 63, unnecessary relaying would occur on Relay Devices 65 and 66.

In this manner, when filtering is set up on individual devices, excess relay flow occurs. Although filtering information can be set up for the entire network and not individual devices (for example, in the example mentioned above, filtering settings would be applied to all Relay Devices 61~66 in order to filter access to Server 80 from Computer Terminals 73, 75, and 76), so that an excess load would not occur, but, in this case, it would be very tedious to reset if filtering settings were ever to change. Also, with regards to filtering content, flow that is not to be filtered would be subject to filtering if other devices were to have filtering set up, posing a risk for setup errors in addition to the process being unrealistic.

In other words, for FIG. 23, if filtering is set up on Relay Device 63 to filter access to Server 80 from Computer Terminals 73, 75, and 76, and the same filtering settings for Relay Device 63 are applied to all Relay Devices 61~66 to improve network efficiency, access to Server 80 from Computer Terminals 71, 72, and 74 would also be filtered, causing an error indicating that the current filtering settings are not being properly reflected.

Meanwhile, on servers to date, filtering is applied through access restrictions set up by a server application, but an error had occurred in the past in which a focused access attack could not be prevented regardless of access restrictions.

In particular, setting up access restrictions only to the server alone is useless towards unauthorized access such as Denial of Service Attacks (DOS (Denial of Service) Attack: A user with bad intentions submits a large amount of connection requests to the server, depleting server resources so that connection service is stopped for legitimate users), and even if a firewall stops a device, the access focused on that server will eat away the server resources mid-process, stopping all other communication.

Also, the aforementioned current technology (Japanese Unexamined Patent Application Publication H11-27270) does not attempt to lighten the load by relaying frames, and requires network load to use a broadcast packet sent out by the management device so that it can recognize all computer terminals. Also, the current technology's filtering tables are simply structured with a combination of address and destination ports, so a filtering control with an advanced protocol cannot be used to exchange several commands between devices.

SUMMARY OF THE INVENTION

This invention was created with these matters in mind, and aims to allow filtering information to be effectively shared through the entire network, implement advanced filtering, and support a network system with lighter network load and improved security.

This invention offers a Network System 1 to solve the aforementioned issues, with characteristics of having a Transmission Medium L that connects devices that make up the network, including Relay Devices 10-1~10-n, and Relay Devices 10-1~10-n, for Network System 1 that carries out filtering on a network and then transmits frames, consisting of a Command Process Division 11a-1 that generates, sends/receives, and parses commands that include filtering information for the sharing of necessary filtering information on the entire network, implementing command parsing, and, when filtering sharing conditions are applied, if the filtering information sent from an adjacent device through the filtering sharing conditions has a destination address, and the port that received the filtering information matches the relay destination ports of the destination addresses, and if there is only one relay destination port for the destination address, filtering information shall be registered on its own device and a protocol will be applied to relay to an adjacent device, but if there is no destination address information in the filtering information sent from the adjacent device through the filtering sharing conditions, the receiving port of the filtering information shall be registered onto itself as also the destination port, and a Filtering Information Sharing Protocol Division 11 will apply control so that filtering information is not relayed to an adjacent device, and Filtering Division 12 shall relay frames and filter discarded information, based on instruction from Filtering Information Sharing Protocol Division 11, as indicated in FIG. 1.

Here, Command Process 11a-1 will generate, send/receive, and parse commands than include filtering information for the sharing of necessary filtering information on the entire network. Filtering Information Sharing Protocol Division 11 will parse commands, and if filtering sharing conditions apply, if the filtering information sent from an adjacent device through the filtering sharing conditions has a destination address, and the port that received the filtering information matches the relay destination ports of the destination addresses, and if there is only one relay destination port for the destination address, filtering information shall be registered on its own device and a protocol will be applied to relay to an adjacent device, but if there is no destination address information in the filtering information sent from the adjacent device through the filtering sharing conditions, the receiving port of the filtering information shall be registered onto itself as also the destination port and protocol will be applied so that the filtering information is not relayed to an adjacent device. Filtering Division 12 relays frames and filters discarded information based on instruction from Filtering Information Sharing Protocol Division 11.

This invention's network system is structured so that when filtering information is to be shared, if the filtering information has a destination address, and the receiving port of the filtering information matches the relay destination ports of the destination addresses, and if there is only one relay destination port for the destination address, filtering information shall be registered on its own device and then relayed to an adjacent device, but if there is no destination address information in the filtering information sent from the adjacent device through the filtering sharing conditions, the receiving port of the filtering information shall be registered onto itself as also the destination port, and filtering information will not be relayed to an adjacent device. Through this method, filtering information can be effectively shared throughout an entire network, advanced filtering can be achieved, and it becomes possible for the network load to be lightened and security to be improved.

BRIEF DESCRIPTION OF THE DRAWINGS

FIG. 7 Figure indicating the correspondence of filtering headers and identification header type values.

FIG. 8 Figure indicating the field type settings values.

FIG. 19 Flowchart indicating the actions run when the ADD ENTRY command/ADD RELATIVE ENTRY command is received.

DETAILED DESCRIPTION OF THE PREFERRED EMBODIMENTS

Figure 1:
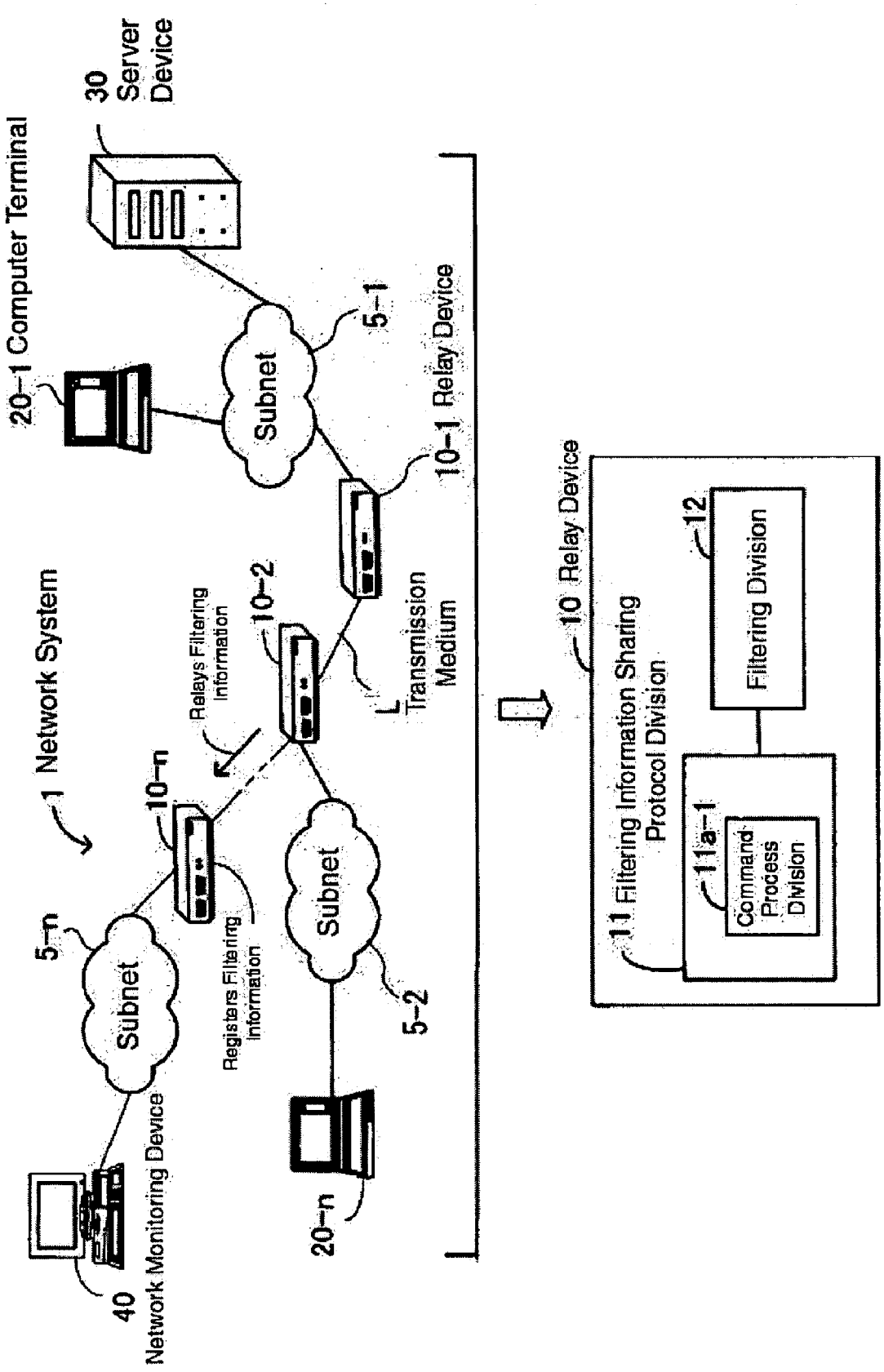
FIG. 1 Fundamental drawing of this invention's network system.

The following explanation uses drawings of this invention's working form as reference. FIG. 1 is a fundamental drawing of this invention's network system. Network System 1 uses Transmission Medium L (can be either with wires or wireless) to connect each structural device; consists of Relay Devices 10-1~10-n (general term "Relay Device 10"), Computer Terminals 20-1~20-n, Server Device (hereinafter "Server") 30, Network Monitoring Device 40, and Subnet 5-1~5-n; and is a system that applies filtering on a network and transmits frames (or packets, cells. This invention will unify these terms).

Relay Device 10 consists of Filtering Information Sharing Protocol Division 11 and Filtering Division 12, and Filtering Information Sharing Protocol Device 11 includes Command Process Division 11a-1.

Command Process Division 11a-1 generates and parses commands that include filtering information for the sharing of necessary filtering information on the entire network. Filtering Information Sharing Protocol Division 11, when running command parsing, applies a protocol to match the receiving ports of the filtering information with the destination address relay ports if the filtering information has a destination address in the filtering sharing conditions sent from an adjacent device, and if there is only one relay port for the destination address, filtering information will be registered on its own device and then relayed to an adjacent device.

Further, if there is no destination address information in the filtering information sent from the adjacent device through the filtering sharing conditions, the receiving port of the filtering information shall also become the destination port and register the filtering information onto itself, and apply a protocol so that filtering information is not relayed to an adjacent device. Filtering Division 12 will apply frame relay of filtering information or user service signals, or filtering of discarded information, based on control instructions determined by Filtering Information Sharing Protocol Division 11.

Server 30 supports special services for computer terminals in the network. It has Command Process Division 11a-1 within Filtering Information Sharing Protocol Division 11 and a command transmission division. Server 30 also generates commands including filtering information based on at least one of: computer terminals that permit service from Server 30, access permission lists, or port numbers that support self-addresses and services. It sends these commands to adjacent relay devices, and can also run computer terminal filtering processes on the entire network for access to Server 30.

Network Monitoring Device 40 monitors operations on machines within the network. It has Command Process Division 11a-1 within Filtering Information Sharing Protocol Division 11 and a command transmission division, and can generate commands according to externally set filtering information (manual settings from the user, etc.), can send these commands to adjacent relay devices, and can allow filtering information to be shared altogether within the entire operation monitored network (in other words, Relay Devices 10-1~10-n).

This invention's filtering information sharing protocol shall be called FISP from now on. FISP is the name for the protocol developed for this invention to enable sharing through the exchange of filtering information between devices on the network.

Figure 2:
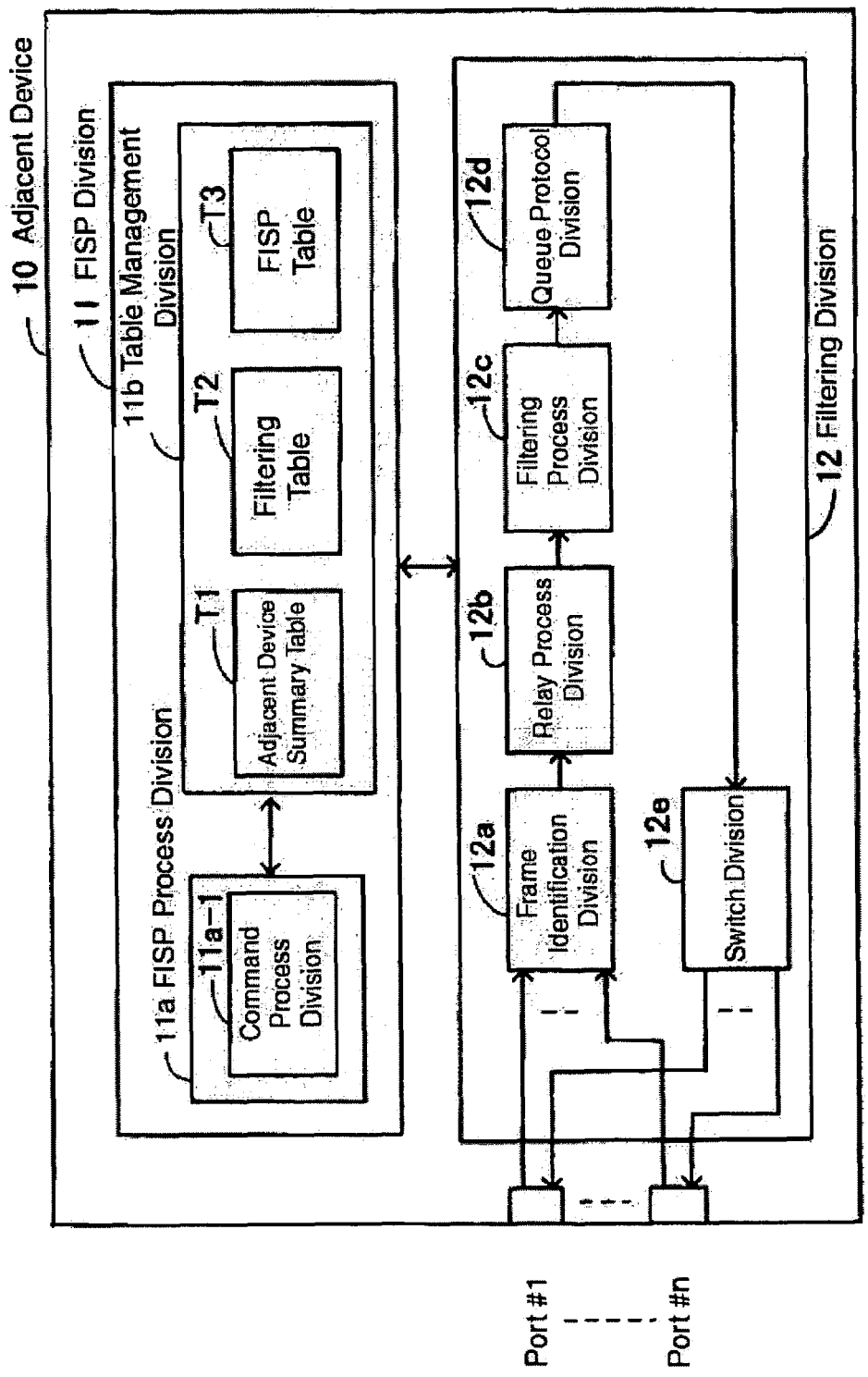
FIG. 2 Figure indicating the structure of the relay device.

Next, the structure of Relay Device 10, which uses FISP functions, shall be explained. FIG. 2 indicates the structure of Relay Device 10. Relay Device 10 consists of FISP Division 11 and Filtering Division 12. FISP Division 11 consists of FISP Process Division 11a and Table Management Division 11b, and controls the entire FISP protocol. Also, Filtering Division 12 consists of Frame Identification Division 12a, Relay Process Division 12b, Filtering Process Division 12c, Queue Control Division 12d, and Switch Division 12e.

Table Management Division 11b for FISP Division 11 manages the tables Adjacent Device Summary Table T1, Filtering Table T2, and FISP Table T3. Adjacent Device Summary Table 1 stores adjacent device addresses and the adjacent device router numbers in groups. Filtering Table T2 registers filtering setting information (frame relay/discard details) for relay devices. FISP Table T3 stores command details such as the ADD ENTRY command detailed below and the ADD RELATIVE ENTRY command, etc., sent from adjacent devices.

FISP Process Division 11a, including Command Process Division 11a-1, processes FISP commands (including command generation and parsing) and executes entry/deletion on the aforementioned tables T1~T3.

Frame Identification Division 12a of Filtering Division 12 receives frames entered from Port #1~#n, executes a frame identification process, adds to the identification process for frames with standard relay devices, and transmits to FISP Process Division 11a if a FISP command is accepted. Relay Process Division 12b determines addresses from the identified frame information (Relay Process Division 12b may be structured to have Frame Identification Division 12a functions).

Filtering Process Division 12c executes the frame filtering process (in the diagram, Filtering Process Division 12c is positioned after the Relay Process, but may be positioned before Relay Process Division 12b).

Queue Control Division 12d executes priority protocol set up on devices. Switch 12e outputs frames based on the destination port between Ports #1~#n determined by Relay Process Division 12b. Also, it outputs filtering information (commands including filtering information) generated from FISP Division 11 from the corresponding port.

Next, commands defined in FISP will be explained. When the relay devices and server are started up, or when FISP functions are turned ON, TCP (Transmission Control Protocol) connections will be established to the designated devices (FISP TCP port numbers can be any number, for example, 7373, as long as they are not well-known ports), such as adjacent devices for relay devices and default gateways (the router that sends frames to their destination after frames to be sent are transferred to a router is called a default gateway) for servers. After TCP connections are established, filtering information can be exchanged using the seven types of commands defined for this invention outlined below. Furthermore, numbers indicated below such as format octet values and command numbers, etc., are example numbers only.

Figure 3:
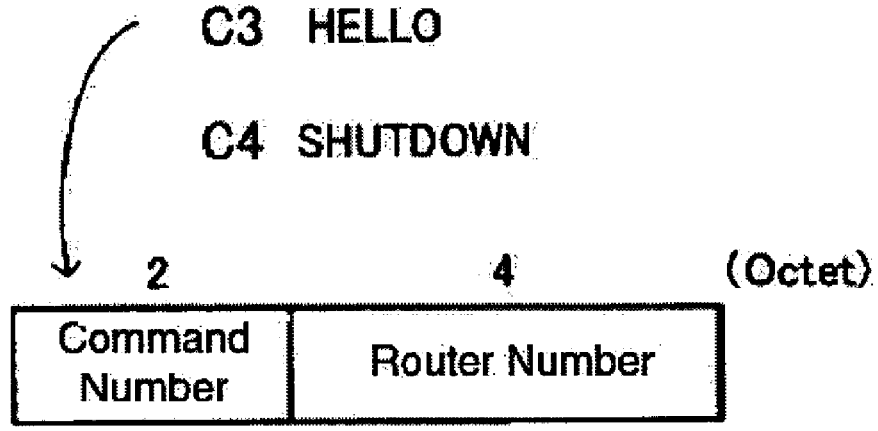
FIG. 3 Figure indicating the command format of REGISTRATION, HELLO, and SHUTDOWN commands.

FIG. 3 indicates the REGISTRATION, HELLO, and SHUTDOWN command formats. Each of REGISTRATION Command C1, HELLO Command C3, and SHUTDOWN Command C4 are the same format, and consist of a command number and router number.

REGISTRATION Command C1 is used to communicate to adjacent devices that the FISP function has initiated on its own device, and is the command sent when the FISP starts up. Command numbers refer to the type of command, and the command number is 1 for REGISTRATION Command C1.

Router numbers are the numbers used to classify relay devices, and a unique number is applied to each device within the network (router numbers can be determined either by using routing numbers determined through methods similar to the current routing protocol (such as OSPF (Open Shortest Path First), etc.), or using the same method). Once a device's router number is determined, it cannot be changed. (In other words, values reported through REGISTRATION Command C1 will be used continuously.)

HELLO Command C3 is a command sent to adjacent devices regularly to indicate that FISP functions are working on its own device. The command number for HELLO will be 3. A device will set its own router number as the router number. The time interval for HELLO Command C3 will be 30 seconds by default, but a value determined within the network may be used instead.

SHUTDOWN Command C4 is a command sent to adjacent devices when the FISP functions on a device itself turns OFF. If a HELLO Command C3 is not received from an adjacent device, SHUTDOWN Command C4 can also be used to notify adjacent devices of a malfunctioning device.

The SHUTDOWN Command number is 4. If a device is to report to adjacent devices that FISP services are to be stopped, the router number shall be set to its own device's router number. If HELLO Command C3 does not receive a response from a device, that device's router number shall be set, and adjacent devices will be notified of the malfunctioning device (in practice, SHUTDOWN Command C4 is frequently used for the latter case).

Figure 4:
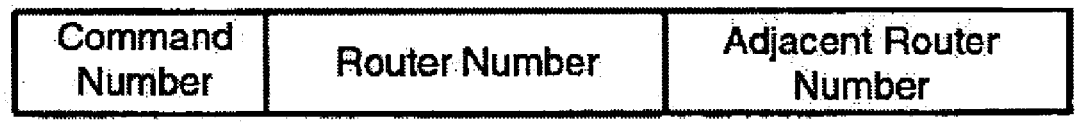
FIG. 4 Figure indicating the command format of the REGISTRATION REPLY command.

FIG. 4 indicates the REGISTRATION REPLY command format. REGISTRATION REPLY Command C2 is a reply command returned by the adjacent device that received the aforementioned REGISTRATION Command C1. The REG- ISTRATION REPLY command number is 2. Router numbers will remain set as they were for the REGISTRATION command, and adjacent router numbers will be set to the router number of the adjacent device which received REGISTRATION Command C1. Through this, relay devices that sent REGISTRATION Command C1 can attain the router numbers for adjacent devices.

Figure 5:
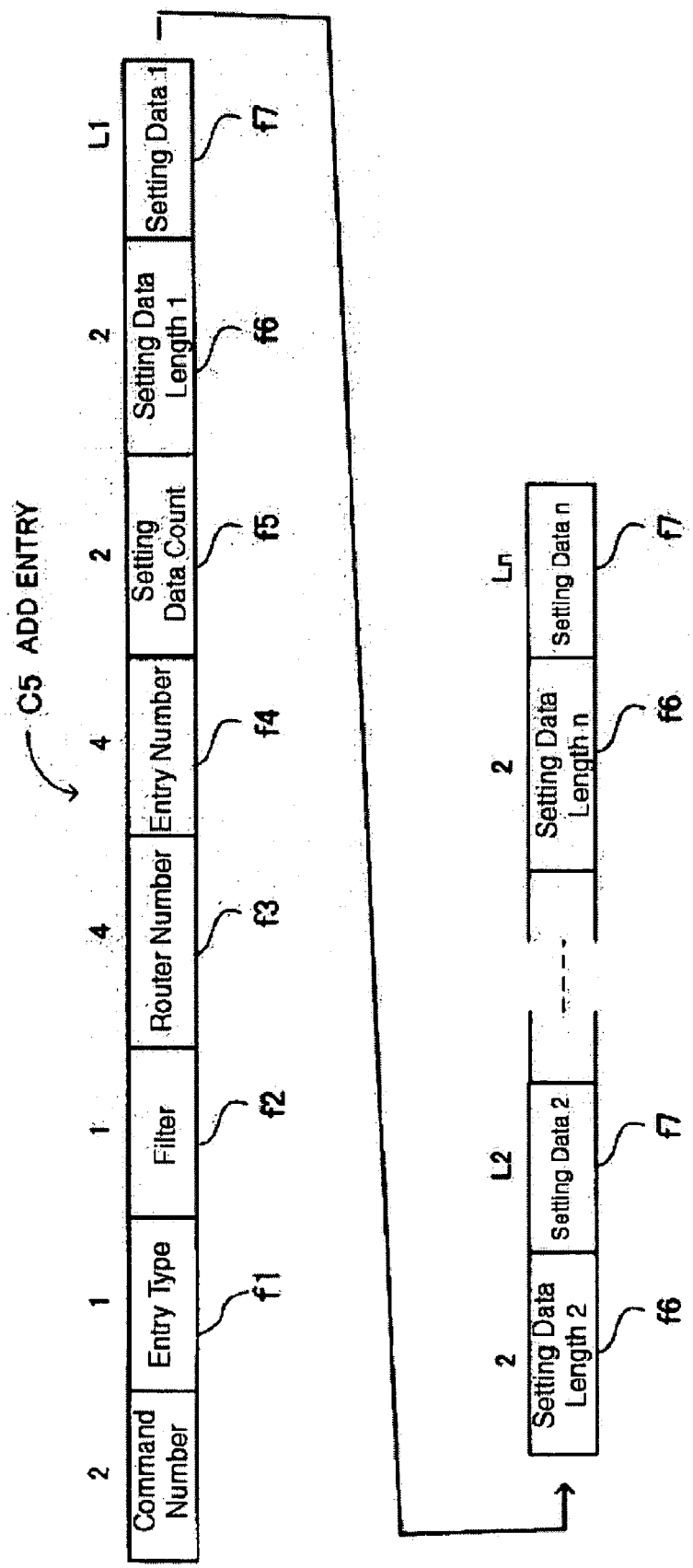
FIG. 5 Figure indicating the command format of the ADD ENTRY command.

FIG. 5 indicates the ADD ENTRY command format. ADD ENTRY Command C5 is a main FISP function command, and is used when filtering information set on its own device, or received from adjacent devices, is to be transferred. The command format consists of the command number, entry type, filter, router number, entry number, setting data count, setting data length 1~n, and setting data 1~n. The ADD ENTRY Command C5 number will be 5. Other fields (f1)~(f7) will be defined as described below.

(f1) Entry Type

A field that designates whether filtering information is to be shared or not. Can be two values, either 0 or 1. If 0, the filtering information sent may be relayed to adjacent devices if permitted (applies to Setting Data f7), but may not be relayed if filtering sharing conditions do not match. If 1, the filtering information sent must be relayed to adjacent devices and registered, regardless of filtering sharing conditions (forced sharing of filtering information).

Filtering sharing conditions are conditions that determine whether filtering information is to be shared by relay to adjacent relay devices, or not to be shared. This condition has three options. The first is to register filtering information onto its own device and relay filtering information to adjacent devices, only if the filtering information sent has a destination address, and the receiving port of the filtering information matches the relay destination port of the destination address, and only one relay destination port exists for a destination address.

The second option is not to register filtering information onto its own device and not to relay filtering information to adjacent devices if a destination address exists in the filtering information but the relay port of the destination address does not match the receiving port of the filtering information.

The third option is to register filtering information onto its own device after adding filtering information, but not to relay filtering information to adjacent devices, if a destination address does not exist in the filtering information, and the receiving port becomes the destination port for the filtering information.

If the entry type is 0, these three conditions will be evaluated, and relay and/or registration will be determined. If the entry type is 1, a forced relay and registration will occur regardless of these three conditions. General filtering sharing condition examples will be given later in this document.

(f2) Filter

A field that designates filtering as to whether frames are discarded or relayed. Can be two values, either 0 or 1. If 0, the frames that match the filtering information will be discarded, and if 1, the frames that match the filtering information will be relayed.

(f3) Router Number

If the filtering information is set on the device (for example, manual settings from the operator, etc.), and the ADD ENTRY Command C5 is used to relay this information to adjacent devices, the device's own router number will be set. If the ADD ENTRY Command C5 sent from an adjacent device must be relayed once again to another adjacent device, same the router number from ADD ENTRY Command C5 will be set on the device.

(f4) Entry Number

A unique number that supports filtering information, given to each piece of filtering information set up on a device. For example, if filtering information setting data 1~3 is set on relay device A, setting data 1~3 is given the entry number 1. If the ADD ENTRY Command C5 sent from an adjacent device must be relayed once again to another adjacent device, the same entry number from ADD ENTRY Command C5 will be set on the device.

Entry numbers must be unique only within a device. For example, if setting data 1~3 is given the entry number 1 on relay device A, relay device B may also have its shared setting data 1~3 with an entry number 1 if it is unique within relay device B, resulting in relay device A and relay device B both having the same entry number 1 (even if the same entry number exists on different devices, these figures can be identified through their grouping with router numbers and entry numbers).

(f5) Setting Data Count

Designates the field count required by the filtering information of setting data 1~n. For example, if Setting Data 1 set by the destination address exists in the filtering information with Setting Data 2 set by the port number, the setting data count would be 2 (in other words, the setting data count would be set to the 'n' of setting data 1~n).

(f6) Setting Data Length 1~n

A field that designates the Setting Data 1~n length in Octet units. In the diagram, Setting Data Length 1~n is set up before the setting data fields supporting Setting Data 1~n.

(f7) Setting Data 1~n

A field that sets filtering information, and can set up to n types of filtering information. One setting data area consists of several fields as indicated in FIG. 6.

Figure 6:
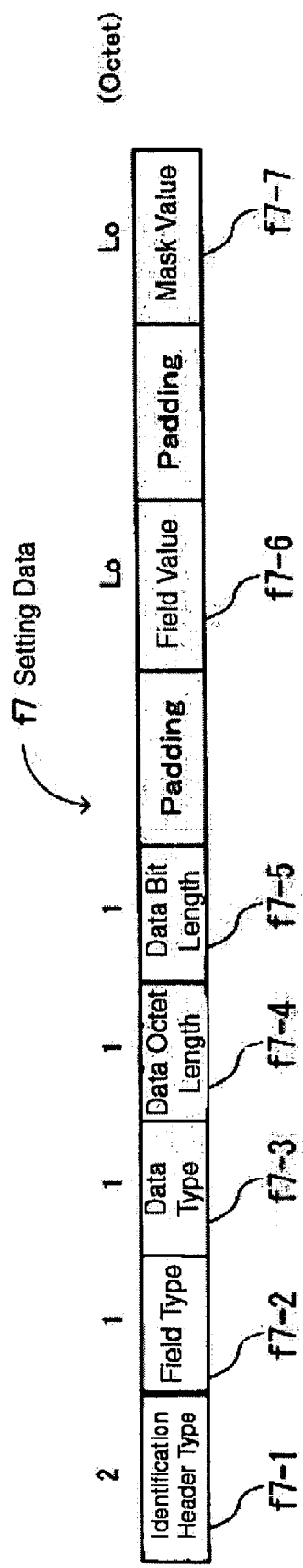
FIG. 6 Figure indicating the field format of the setting data.

FIG. 6 indicates the setting data field format. Setting Data f7 has fields (f7-1)~(f7-7), as described below.

(f7-1) Identification Header Type

A field that designates headers (protocol) that support filtering. The target header and identification header type value must be unique. An example is indicated in FIG. 7. FIG. 7 indicates the correspondence of filtering headers and identification header type values. For example, if frame IPv4 is targeted for filtering then 0×1000 is entered in the identification header type field.

(f7-2) Field Type

A field that designates which field, within headers with identification header type set, is targeted for filtering entry. Values must be unique for each header type. An example is shown in FIG. 8. FIG. 8 indicates field type setting values. The diagram shows a setting value example for the IPv4 field type. For example, if filtering is to be applied after looking at the destination address, the field type value will be 12.

(f7-3) Data Type

A field that indicates if a filtering entry target is a destination address or something else. If 1 it is a destination address, if 0 it is different field data that is targeted for field entry. FISP only sets filtering information against the flow when a destination address is designated, so this value is used to determine whether filtering information is to be relayed or not to be relayed. Reasons for applying special treatment for destination addresses are given for FIG. 9, below.

(f7-4) Data Octet Length

A field that designates the field length (Octet length) designated by the identification header type and field type. For example, if 0×1000 is designated for the identification header type, and a destination address is designated for the field type, the destination address field length for IPv4 will be designated as an Octet (in this case, 4).

(f7-5) Data Bit Length

Designates the field length (bit length) designated by the identification header type and field type. The Data bit length is used when the designated field for filtering entry cannot be written in Octet units, and the field padding portions for field values and mask values (described below) must be determined.

For example, since the Flow Label for IPv6 is a field of 20 bits, it cannot be written in Octet units. In cases such as this one, the Data Octet Length becomes 3, the Data Bit Length is 20, Flow Label is entered in right-justified form for the Field Value f7-6, and padding for the left side of Field Value f7-6 becomes 4.

(f7-6) Field Value

The designated field filtering conditions are inputted in right-justified form in the Octet count field for the Data Octet Length. The remainder becomes padding.

(f7-7) Mask Value

The designated field masking conditions are inputted in right-justified form in the Octet count field for the Data Octet Length. Masks allow for only a portion of the designated field to apply to filtering conditions, indicating the remaining portion to be valid/invalid if its condition designations were to be trivialized. For each bit, 0 indicates invalidity, 1 indicates validity. A usage example for mask values is shown below in FIG. 10.

Figure 9:
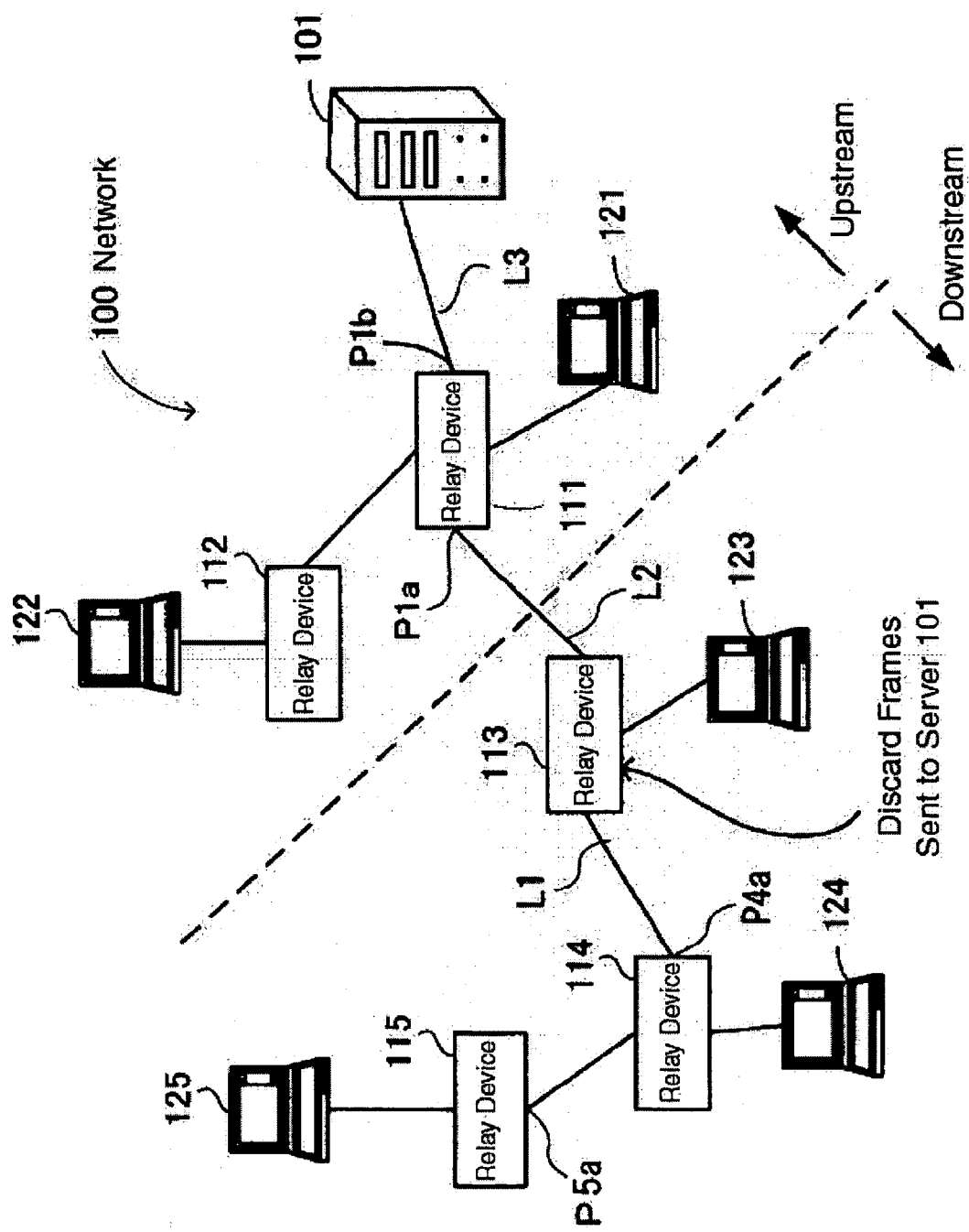
FIG. 9 Figure explaining the relay and registration actions of the filtering information.

FIG. 9 explains the relay and registration actions for the filtering information. Network 100 consists of Server 101, Relay Devices 111~115, and Computer Terminals 121~125 (Subnets have been omitted). To note the connection relationship between devices, Relay Devices 111~115 are each connected to Computer Terminals 121~125. Relay Device 111 is connected to Server 101 and Relay Devices 112 and 113. In addition, Relay Device 113 is connected to Relay Device 114, and Relay Device 114 is connected to Relay Device 115.

First, the relay and registration actions for filtering information including destination addresses shall be explained. For Network 100, let us say that filtering information ("Filtering Information A") is set through manual settings, etc., on Relay Device 113 to discard frames addressed to Server 101. Filtering Information A has a 1 written in the Data Type f7-3 field, and Server 101's address is written as the destination address on Field Value f7-6.

Here, if these types of settings are applied to Relay Device 113, all frames headed for Server 101 from devices below and including Relay Device 113 should be deleted, but it is necessary for Filtering Information A registered on Relay Device 113 to be relayed and registered to Relay Devices 114 and 115, but not Relay Devices 111 and 112, during Filtering Information A's relay actions between relay devices after Relay Device 113 was manually set.

This is because access to Server 101 would not be possible on any of the Computer Terminals 121~125 if relay and registration were to occur on Relay Devices 111 and 112 (further, Relay Device 113 manually set with Filtering Information A would send Filtering Information A to its adjacent Relay Device 111, but Filtering Information A would not be registered on Relay Device 111).

Thus, Relay Device 114, that received Filtering Information A with destination addresses, must be able to evaluate whether it is downstream from Relay Device 113 (and that it must register Filtering Information A), and Relay Device 111, that received Filtering Information A with destination addresses, must be able to evaluate whether it is upstream from Relay Device 113 (and that it must not register Filtering Information A).

As a means of evaluation, this invention has destination address information within the filtering information sent from adjacent devices (Data Type f7-3 is '1'), and only allows filtering information to be registered on its own device if the receiving port of the filtering information matches the destination address relay destination port, and if there is only one relay destination port for the destination address.

For example, Relay Device 114 is connected to Relay Device 113 through Line L1 and Port P4a, so the port that receives Filtering Information A would be Port P4a. Port P4a would also be used if some other type of information were to be relayed to the Server 101 destination address.

In other words, the port that received Filtering Information A and the relay destination port of the destination address both match as Port P4a, and other relay ports for this destination address do not exist, so Filtering Information A would be registered on Relay Device 114. The same would apply to Relay Device 115, with the port that received Filtering Information A and the relay destination port of the destination address matching as Port P5a, and there being only one relay destination port applicable for this destination address, so Filtering Information A would be registered.

Meanwhile, looking at Relay Device 111, it is connected to Relay Device 113 through Line L2 and Port P1a, but is also connected to Server 101 through Line L3 and Port P1b. The port that receives Filtering Information A is Port P1a. Port P1b would also be used if some other type of information were to be relayed to the Server 101 destination address. In other words, the port that received Filtering Information A and the relay destination port for the destination address would not match as Port P1a and Port P1b, so Filtering Information A would not be registered on Relay Device 111 (it would not be registered, nor would it be relayed). This invention, using protocol such as these, makes it possible to prevent the filtering of both flow that is to be filtered and the flow that is not to be filtered. Further, if a device within the network does not have FISP functions, filtering information will be shared only between devices that do have FISP functions.

Next, the relay and registration actions for filtering information without destination addresses shall be explained. Let us say that filtering information ("Filtering Information B") is set on Relay Device 113 to discard frames from TCP Port Number 80. This means that frames from web access will be discarded.

Here, if these types of settings are applied to Relay Device 113, all frames passing through Relay Device 113 from web access would be deleted, and the web access frames simply need to be discarded on Relay Device 113 for the flow between Relay Device 113-Computer Terminal 123, the flow between Relay Device 113 and Relay Device 114, and the flow between Relay Device 111 and Relay Device 113. However, if Server 101 was a web server, and Filtering Information B is relayed and registered on Relay Device 111, nothing could access Server 101.

Therefore, if filtering information without a destination address is first set to one relay device through manual settings, etc. on this invention, that relay device will transmit filtering information to adjacent devices. Then, the relay devices that receive the filtering information relay without a destination address (filtering information for which Data Type f7-3 is 0), shall register the receiving port as the destination port on its own device, apply a protocol so that frames to be discarded are not output from the destination port (if filtering conditions are discarded), and that filtering information will not be relayed to adjacent devices.

For example, if Relay Device 113 is manually set with Filtering Information B, Relay Device 113 would transmit Filtering Information B to adjacent Relay Devices 114 and 111. Relay Device 114 confirms that the relayed Filtering Information B does not have a destination address, registers Port P4a that received Filtering Information B as also the destination port, and stops the output of web access frames from Port P4a that became the destination port. Similarly, Relay Device 111 confirms that the relayed Filtering Information B does not have a destination address, registers Port P1a that received Filtering Information B as also the destination port, and stops the output of web access frames from Port P1a that became the destination port (for example, if a web server was connected to Relay Device 115, output of access frames to this web server would stop).

Thus, Relay Device 113 discards web access frames from Computer Terminal 123, and web access frames from Relay Devices 111 and 114 cannot be sent to Relay Device 113 (web access frames from Relay Devices 111 and 114 are not discarded on Relay Device 113, but are not outputted by Relay Devices 111 and 114, so the traffic load would lighten for the flow between Relay Device 113-Relay Device 114 and between Relay Device 111-Relay Device 113).

Figure 10:
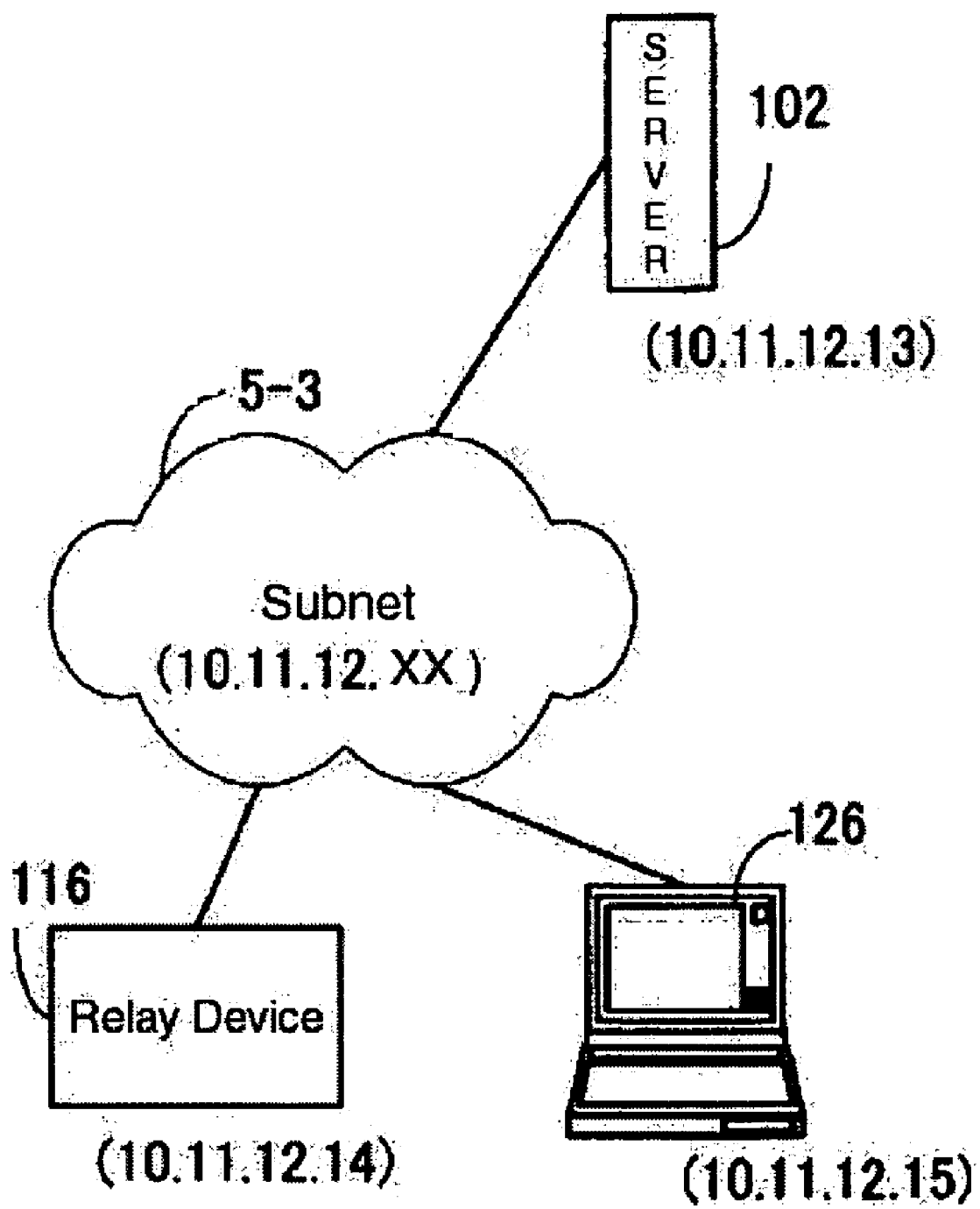
FIG. 10 Figure explaining a usage example of the mask value.

Next, the mask value usage example shall be explained. FIG. 10 explains the usage example of mask values. Subnet 5-3 connects to Relay Device 116, Computer Terminal 126, and Server 102. The addresses (IP addresses) for Subnet 5-3 are 10.11.12.OO ('OO' being a random number), so the address for Server 102 is 10.11.12.13, the address for Relay Device 116 is 10.11.12.14, and the address for Computer Terminal 126 is 10.11.12.15.

If filtering is to be applied to frames sent to Server 102, the destination address for Server 102, 10.11.12.13, is to be set in the Filtering Information Field Value f7-6, and Mask Value f7-7 is set to all "1" to indicate that all values are valid for 10.11.12.13.

If filtering is to applied to all devices connected by Subnet 5-3, the destination addresses for Server 102, 10.11.12.OO, are to be set in the Filtering Information Field Value f7-6, and Mask Value f7-7 is set as "1" for the upper 24 bits and "0" for the lower 8 bits, to indicate that values for 10.11.12 are valid but the 'OO' value of the lower 8 bits is invalid.

Figure 11:
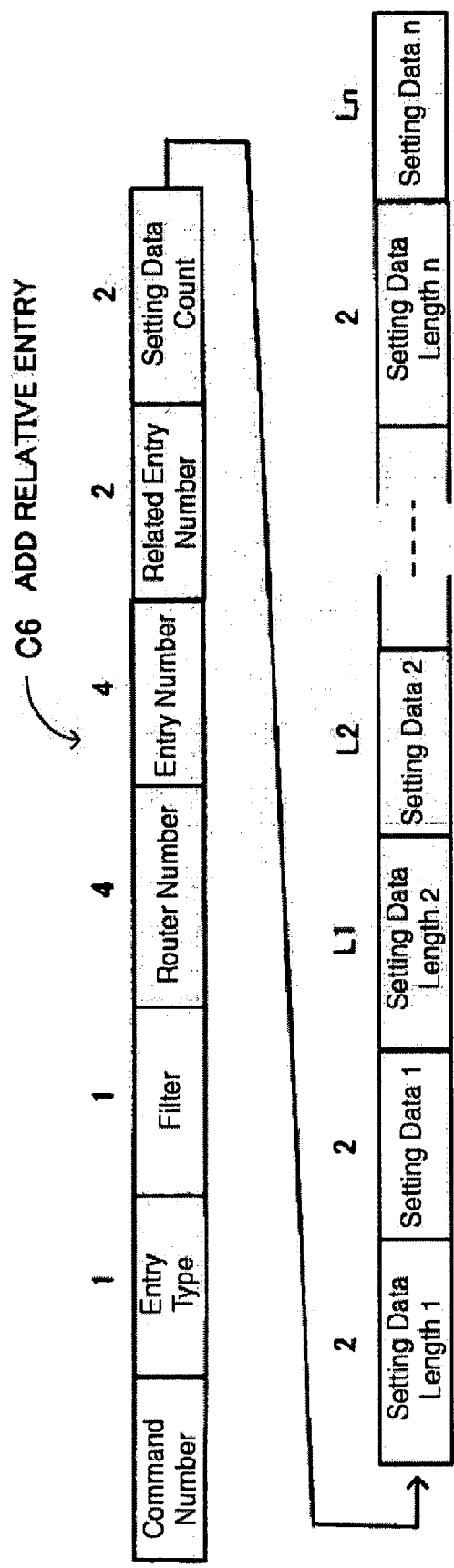
FIG. 11 Figure indicating the command format of the ADD RELATIVE ENTRY command.

Here, if fields such as Mask Value f7-7 are not present, and if filtering is to apply to all devices connected to Subnet 5-3, since all 256 devices (up to 256 addresses can be assigned) that apply to the lower 8-bit 'OO' value for Subnet 5-3 can be connected, and a maximum of 256 pieces of filtering information must be created, but by setting a Mask Value in the field information that indicates whether Field Values f7-6 are valid/invalid, as in this invention, it becomes possible to set devices for filtering in an efficient manner Returning to the next command explanation, the remaining ADD RELATIVE ENTRY and REMOVE ENTRY shall be explained. FIG. 11 indicates the ADD RELATIVE ENTRY command format. ADD RELATIVE ENTRY Command C6 is a command used to designate filtering information, as is ADD ENTRY Command C5.

Since filtering policies vary for each relay device, it is not uniquely determined whether to discard or to relay all frames that do not apply to the filtering conditions (in other words, if filtering information settings are not in place on a relay device positioned within the network, there could be devices that allow all frames to pass by default, as well as devices that discard all frames by default). Because of this, if settings are to be made to discard only certain filtering conditions, it is necessary to make separate settings to relay all the other conditions. ADD RELATIVE ENTRY is a command used for this purpose.

For example, let us say that there is a hypothetical Relay Device R1 that has default settings to allow all frames when filtering information is not set. For relay devices such as Relay Device R1, there is no point in using ADD ENTRY Command C5 to set filtering information that designates "Allow only frames with Server 1 as the destination" (because Relay Device R1 is already set to allow all frames by default).

"Allow only frames with Server 1 as the destination" also means "Discard frames that do not have Server 1 as the destination," so for devices such as Relay Device R1 with default settings, filtering information that says "Discard frames that do not have Server 1 as the destination" is required. To set this filtering information that says "Discard frames that do not have Server 1 as the destination," the ADD RELATIVE ENTRY Command C6 is used.

Figure 12:
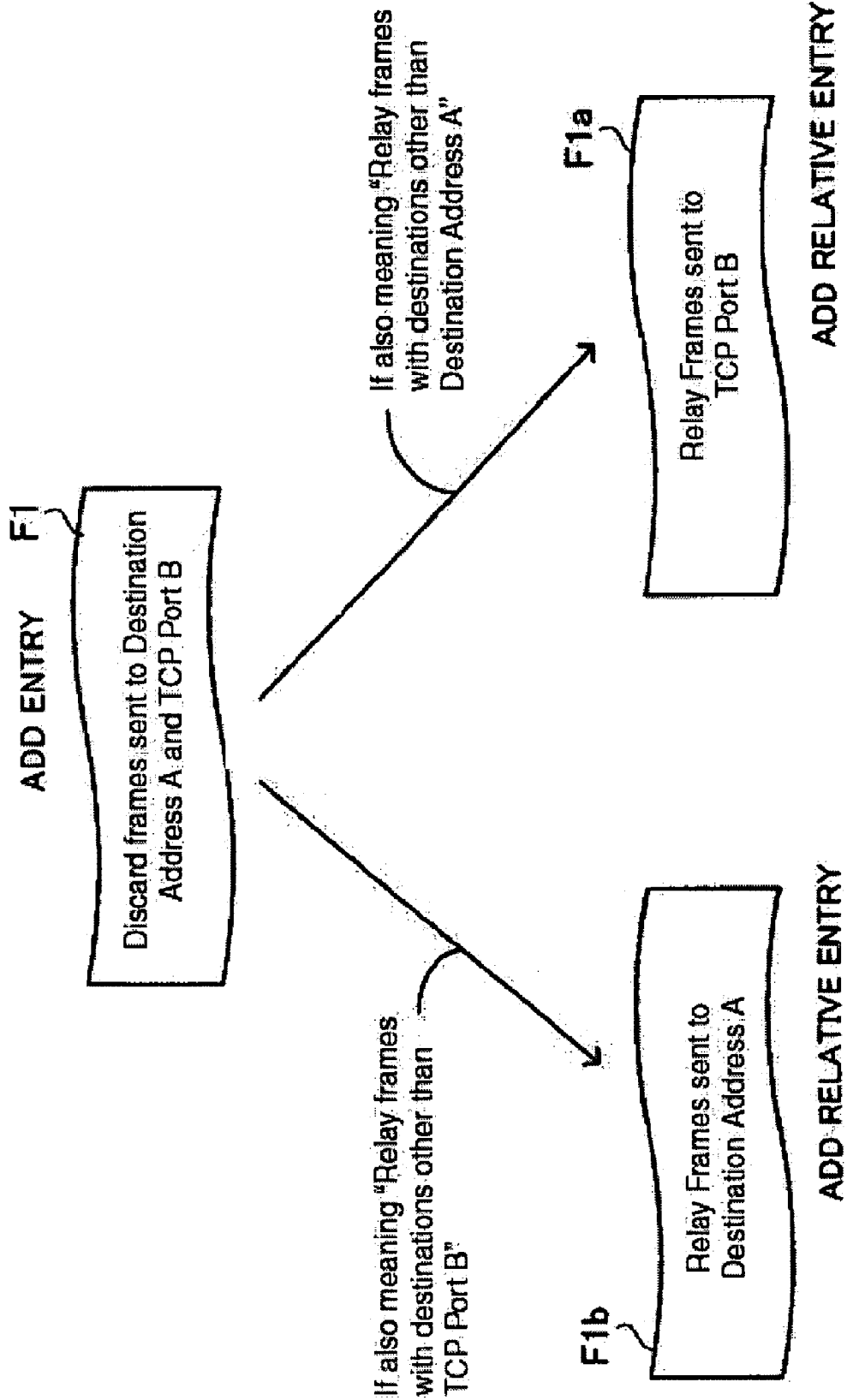
FIG. 12 Figure explaining the usage example for the ADD RELATIVE ENTRY command.

FIG. 12 explains a usage example for the ADD RELATIVE ENTRY command. Say that Filtering Information F1 that says "Discard frames with Destination Address A sent to TCP Port Number B" is set using the ADD ENTRY Command C5. In this case, if frames that do not have Destination Address A are to be relayed, the ADD RELATIVE ENTRY Command C6 is used to set Filtering Information 1a that says "Relay frames sent to TCP Port Number B."

Also, if frames not sent to TCP Port Number B are to be relayed in Filtering Information F1, Filtering Information F1b is set to relay frames sent to Destination Address A using ADD RELATIVE ENTRY Command C6. Further, filtering information for the ADD RELATIVE ENTRY command is set to have lower priority than filtering information for the original ADD ENTRY command.

The ADD RELATIVE ENTRY Command C6 command number is 6. The settings fields for the ADD RELATIVE ENTRY Command C6 is practically the same as ADD ENTRY Command C5, with only the relative entry number added onto it. The relative entry number is made to indicate which filtering information it is related to by designating the entry number assigned to the original ADD ENTRY command. For example, the relative entry number for the ADD RELATIVE ENTRY command related to an ADD ENTRY command with an entry number=1 would also be=1.

Figure 13:
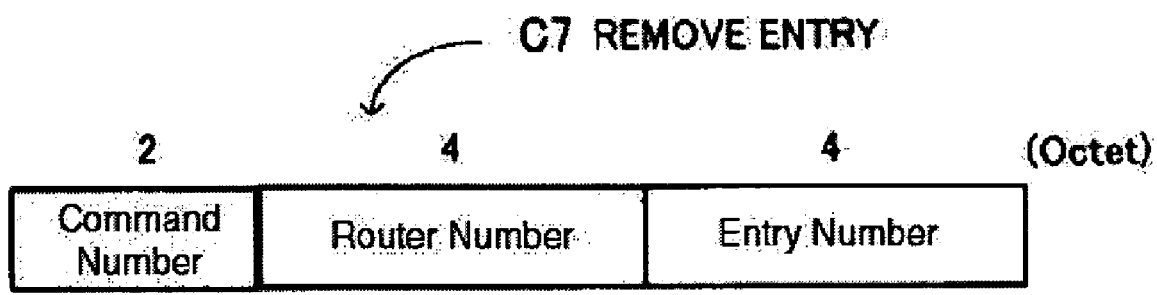
FIG. 13 Figure indicating the command format of the REMOVE ENTRY command.

FIG. 13 indicates the REMOVE ENTRY command format. REMOVE ENTRY Command C7 is used to delete filtering information designated through ADD ENTRY Command C5 and/or ADD RELATIVE ENTRY Command C6. It will be sent if filtering information on a relay device is deleted. REMOVE ENTRY Command C7 has a command number of 7. Router Number and Entry Number set the router number and entry number of the filtering entry to be deleted.

Figure 14:
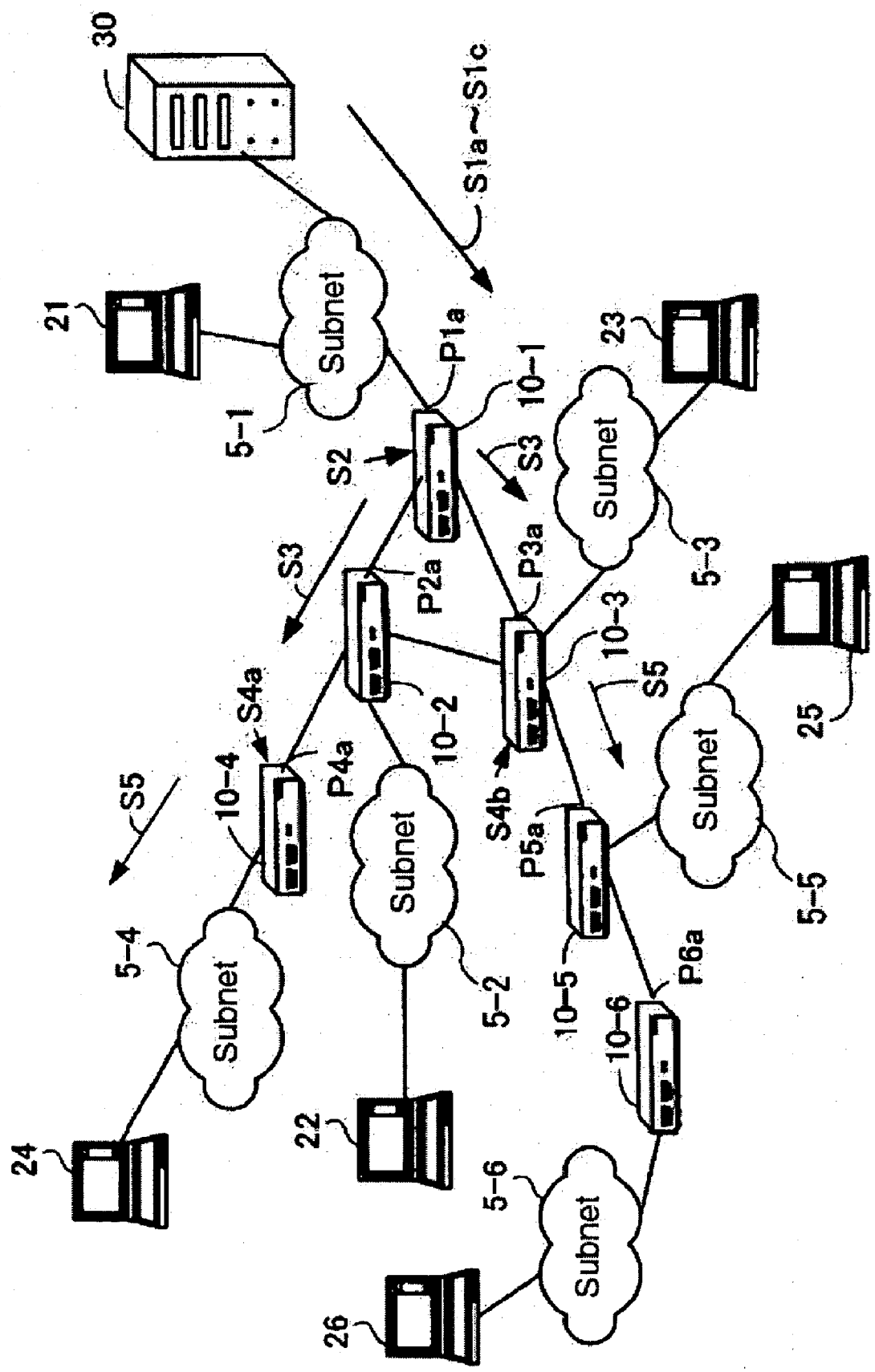
FIG. 14 Figure indicating the network system.

Next, actions for a network system that includes servers and relay devices that are furnished with FISP functions shall be explained. FIG. 14 indicates the network system. Looking at the connection relationship of devices within the network, Subnet 5-1 connects Server 30, Computer Terminal 21, and Relay Device 10-1. Relay Device 10-1 is connected to Relay Devices 10-2 and 10-3. Relay Device 10-2 is connected to Relay Devices 10-3 and 10-4, as well as Subnet 5-2. Subnet 5-2 is connected to Computer Terminal 22.

Relay Device 10-3 is connected to Relay Device 10-5 and Subnet 5-3, and Subnet 5-3 is connected to Computer Terminal 23. Relay Device 10-4 is connected to Subnet 5-4, and Subnet 5-4 is connected to Computer Terminal 24. Relay Device 10-5 is connected to Relay Device 10-6 and Subnet 5-5, and Subnet 5-5 is connected to Computer Terminal 25.

Relay Device 10-6 is connected to Subnet 5-6, and Subnet 5-6 is connected to Computer Terminal 26.

Here, let us hypothesize that Server 30 has a web server in operation, and that its web server settings has a list of access permissions (for example, settings to permit access only for specific posts). The access permissions list is set to permit access only from Subnet 5-3 and Subnet 5-4.

(S1*a*) Server 30 sends the ADD ENTRY Command C5*a* to relay access frames from Subnet 5-3 to Server 30. ADD ENTRY Command C5*a* is set to have Entry Type: 0 (relay and registration determined by filtering sharing conditions), Filter: Relay, Setting Data 1: Destination Address (the address for Server 30, or make Data Type=1. Same applies below), Setting Data 2: Transmission Source Address (Subnet 5-3), Setting Data 3: Destination TCP Port Number 80.

(S1*b*) Server 30 sends the ADD ENTRY Command C5*b* to relay access frames from Subnet 5-4 to Server 30. ADD ENTRY Command C5*b* is set to have Entry Type: 0, Filter: Relay, Setting Data 1:

Destination Address (Server 30), Setting Data 2: Transmission Source Address (Subnet 5-4), Setting Data 3: Destination TCP Port Number 80.

(S1*c*) Server 30 sends the ADD RELATIVE ENTRY Command C6*a* (filtering information from ADD RELATIVE ENTRY Command C6*a* has lower priority than ADD ENTRY Command C5*a* and C5*b*) to relay access frames not from Subnet 5-3 or 5-4 addressed to Server 30. ADD RELATIVE ENTRY Command C6*a* is set to have Entry Type: 0, Filter: Discard, Setting Data 1: Destination Address (Server 30), and Data Type=1. Setting Data 2 is set to Destination TCP Port Number 80.

Here, the access permission lists on Server 30 only has entries for transmission source addresses, but through the FISP Commands described in Steps S1*a*~S1*c* the destination address shall be set as Server 30's address. Through this, filtering information details can be shared to relay devices that are to run filtering (because all flow to other servers could also stop if there is no destination address).

(S2) Relay Device 10-1 receives ADD ENTRY Commands C5*a* and C5*b*, as well as ADD RELATIVE ENTRY Command C6*a*. Since the Entry Type within the commands is 0, filtering sharing conditions are determined. In this case, the sent filtering information has a destination address, and the receiving port of that destination address matches the port that received the filtering information (Port P1*a*), so filtering information is registered and relayed to the adjacent devices.

Through ADD ENTRY Command C5*a*, the information is registered with Filter Type: Relay, Setting Data: Destination Address (Server 30), Transmission Source Address: Subnet 5-3, Destination TCP Port Number: 80, and Transmission Port Number: P1*a*. Through ADD RELATIVE ENTRY Command C6*a*, registration details of Filter Type: Discard, Setting Data: Destination Address (Server 30), Destination TCP Port Number: 80, and Transmission Port Number: P1*a* are given lower priority than ADD ENTRY Commands C5*a* and C5*b*.

(S3) Relay Device 10-1 relays ADD ENTRY Command C5*a* and C5*b*, as well as ADD RELATIVE ENTRY C6*a* to Relay Devices 10-2 and 10-3 (relay Device 10-1 actually sends command details also to Server 30, but since Server 30 does not use a receiving process for ADD ENTRY and ADD RELATIVE ENTRY commands, it is removed from the diagram).

(S4*a*) Relay Device 10-2 receives ADD ENTRY Command C5*a* and C5*b*, as well as ADD RELATIVE ENTRY C6*a*. Since the Entry Type within the commands is 0, filtering sharing conditions are determined. In this case, the sent filtering information has a destination address, and the receiving port of that destination address matches the port that received the filtering information (Port P2*a*), so filtering information is registered and relayed to adjacent devices.

Through ADD ENTRY Command C5*a*, the information is registered with Filter Type: Relay, Setting Data: Destination Address (Server 1), Transmission Source Address: Subnet 5-3, Destination TCP Port Number: 80, and Transmission Port Number: P2*a*. Through ADD ENTRY Command C5*b*, the information is registered with Filter Type: Relay, Setting Data: Destination Address (Server 30), Transmission Source Address: Subnet 5-4, Destination TCP Port Number: 80, and Transmission Port Number: P2*a*. Through ADD RELATIVE ENTRY Command C6*a*, the information is registered with Filter Type: Discard, Setting Data: Destination Address (Server 30), Destination TCP Port Number: 80, and Transmission Port Number: P2*a*.

(S4*b*) Relay Device 10-3 receives ADD ENTRY Command C5*a* and C5*b*, as well as ADD RELATIVE ENTRY C6*a*. Since the Entry Type within the commands is 0, filtering sharing conditions are determined. In this case, the sent filtering information has a destination address, and the receiving port of that destination address matches the port that received the filtering information (Port P3*a*), so filtering information is registered and relayed to adjacent devices.

Through ADD ENTRY Command C5*a*, the information is registered with Filter Type: Relay, Setting Data: Destination Address (Server 30), Transmission Source Address: Subnet 5-3, Destination TCP Port Number: 80, and Transmission Port Number: P3*a*. Through ADD ENTRY Command C5*b*, the information is registered with Filter Type: Relay, Setting Data: Destination Address (Server 30), Transmission Source Address: Subnet 5-4, Destination TCP Port Number: 80, and Transmission Port Number: P3*a*. Through ADD RELATIVE ENTRY Command C6*a*, the information is registered with Filter Type: Discard, Setting Data: Destination Address (Server 30), Destination TCP Port Number: 80, and Transmission Port Number: P3*a*.

(S5) ADD ENTRY Command C5*a* and C5*b*, and ADD RELATIVE ENTRY C6*a*, are relayed from Relay Device 10-2 to Relay Device 10-4 and from Relay Device 10-3 to Relay Device 10-5 (relay occurs from Relay Device 10-2 to Relay Device 10-3, but since they have received the same commands, nothing is processed on Relay Devices 10-2 and 10-3 and the relay is completed).

Thereafter, the same process is carried out on Relay Devices 10-4~10-6, and consequently all Relay Devices are registered to relay frames sent to Server 30, with the transmission source address being Subnet 5-3 or Subnet 5-4, using TCP Port Number 80. The devices are also registered to discard all other frames from different transmission source addresses sent to Server 30 with TCP Port Number 80.

Therefore, since frames from computer terminals not on Subnet 5-3 or 5-4 are immediately discarded on adjacent relay devices (for example, if Computer Terminal 22 tries to access the web through Server 30, through filtering registration details on Relay Device 10-2, frames are immediately discarded), the network is not overloaded, and access limitation processes through software processing within Server 30 also do not cause excess load.

In this manner, although servers until now had suffered network resource damages when DOS attacks occurred because the filtering settings were applied through a server application, with this invention, the server sends out FISP Commands to relay devices and the entire network is structured to apply filtering, so if unauthorized access to the server were to occur the relay devices along the way would discard everything, solving the problem of excess network resources depleting and consequently stopping other communications.

In the above-mentioned actions, the ADD ENTRY command designates that access permissions to Server 30 are always relayed, and the ADD RELATIVE ENTRY command designates that all other access permissions are discarded. Here, the reason for making the designation for all other frames to be discarded an ADD RELATIVE ENTRY command is because all access from all computer terminals will be filtered and discarded regardless of the permissions list if the discarding entry were given priority. If it is an ADD RELATIVE ENTRY command, it will always be registered to have lower priority than ADD ENTRY command details, so entries to be relayed to Subnet 5-3 and 5-4 will run first, and settings will be applied as intended.

Next, the actions of the network monitoring device with FISP functions loaded shall be explained with consideration to the Network Monitoring Device on Server 30 shown in FIG. 14. Let us imagine that all frames for TCP Destination Port 135 are to be discarded through filtering, since TCP Destination Port 135 is not currently used by the entire network.

Until now, since all relay devices require manual settings, etc., settings would become more complex as the network became more complex, but now, the network monitoring device having FISP would send the ADD ENTRY command to discard frames for Destination TCP Port 135, having the Entry Type as 1 (forced sharing), to adjacent devices. To allow relay for TCP Ports other than TCP Port 135, the ADD RELATIVE ENTRY command without entry conditions would have also its Entry Type set to 1 and be sent to adjacent devices. These commands would be relayed to the entire network. Through this, frames for Destination TCP Port 135 would be discarded on all relay devices, and the filtering information would be shared throughout the entire network.

Figure 15:
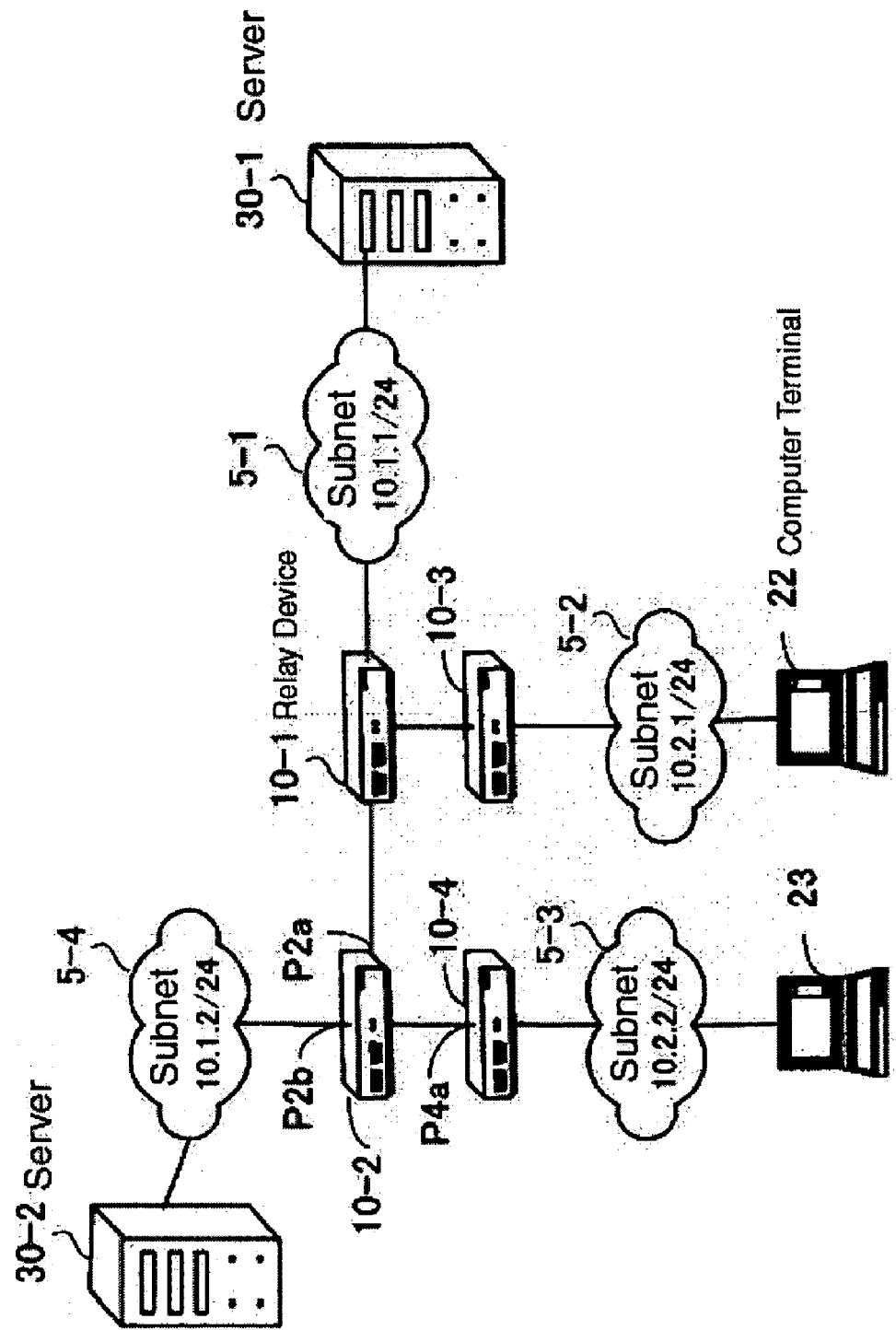
FIG. 15 Figure explaining the actions run when device-specific filtering information is set on a relay device.

Next, the actions used when device-specific filtering information is set on relay devices shall be explained. FIG. 15 explains the actions used when device-specific filtering information is set on relay devices. Looking at the connection relationship between devices in the network, Subnet 5-1 is connected to Server 30-1 and Relay Device 10-1. Relay Device 10-1 is connected to Relay Device 10-2 and 10-3. Subnet 5-2 is connected to Relay Device 10-3 and Computer Terminal 22, and Subnet 5-3 is connected to Computer Terminal 10-4 and Computer Terminal 23. Subnet 5-4 is connected to Relay Device 10-2 and Server 30-2.

Here, let us imagine that manual settings are applied on Relay Device 10-2 so that frames sent to TCP Destination Port Number 80 from the physical Port P2a transmission source are to be discarded.

It is possible to register filtering entries such as these on Relay Device 10-2, but Transmission Source Port P2a is device-specific information for Relay Device 10-2, so it is pointless to share this information with adjacent devices thus there is no need to register such information. Because of this, settings are only affixed internally on Relay Device 10-2 and filtering information is not sent to adjacent devices in this case.

To determine whether information is device-specific or not, set the device-specific information in FISP Processing Division 11a beforehand, and if the externally set input information matches the stored device-specific information, the input information is decided to be device-specific and registration is affixed internally within its own device so that the information is not relayed to other devices. Through this, device-specific filtering information will not be relayed and it becomes possible to prevent excess filtering information from being sent out.

Figure 16:
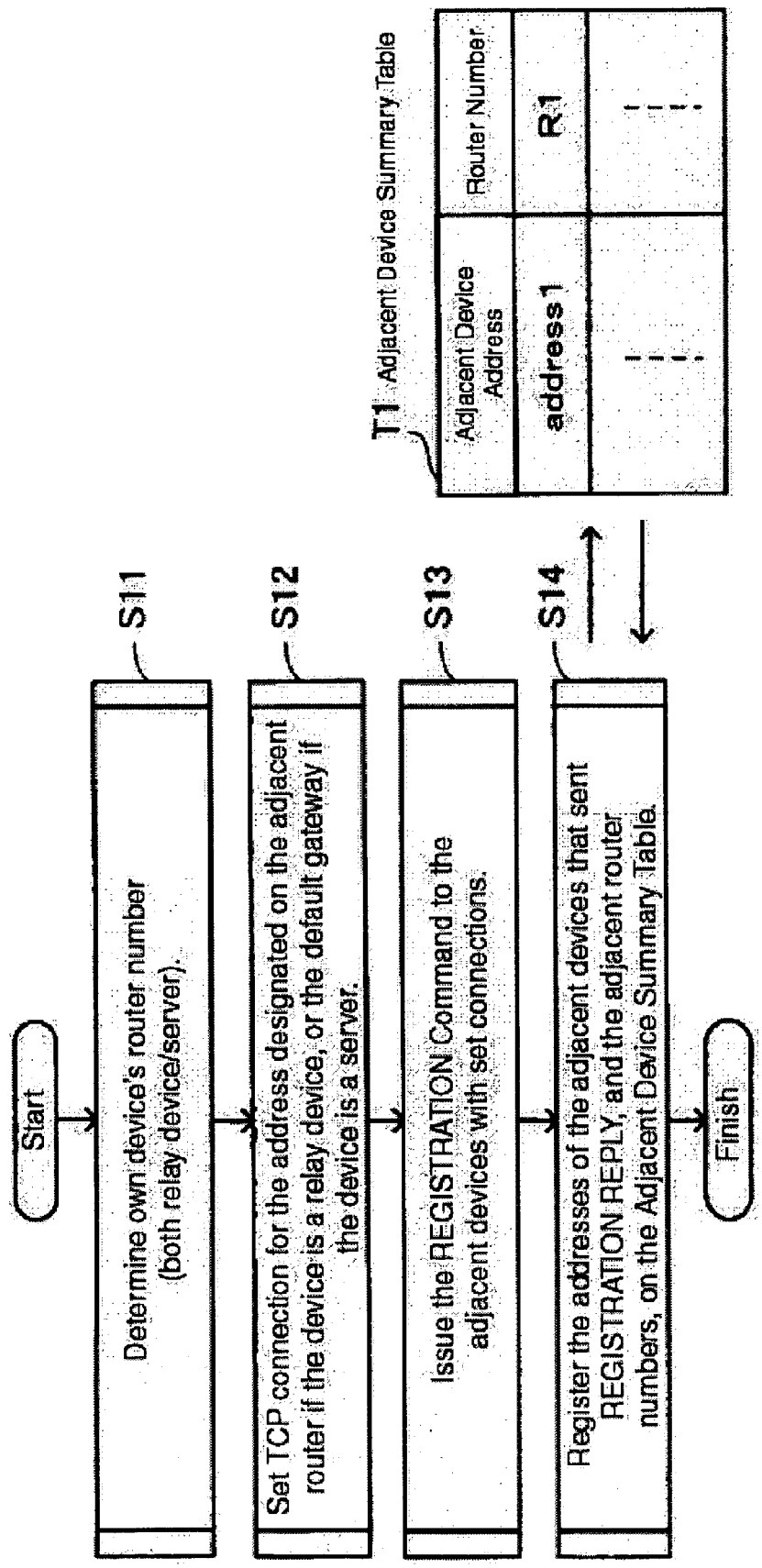
FIG. 16 Flowchart indicating actions run upon FISP startup.

Next, the detailed actions of this invention (FISP Division 11 actions) shall be explained using a flowchart. FIG. 16 is a flowchart that indicates the actions at FISP startup. Devices with FISP functions will run the flow described below at time of startup or when FISP functions are turned ON.

(S11) The router number is determined for its own device (for both relay devices and servers).

(S12) A TCP connection is set on all adjacent devices if the device is a relay device, or on addresses designated by the default gateway if the device is a server. (Port Number: 7373).

(S13) REGISTRATION Command C1 is issued to all adjacent devices to which a connection was established.

(S14) Adjacent device addresses and adjacent router numbers are registered onto the Adjacent Device Summary Table T1 for devices that sent REGISTRATION REPLY Command C2.

As indicated above, when FISP starts up, devices report information to adjacent devices and receive information from adjacent devices. Also, Adjacent Device Summary Table T1 is a table that maintains groups of adjacent devices that understand FISP and their router numbers, and is used to relay FISP commands.

Figure 17:
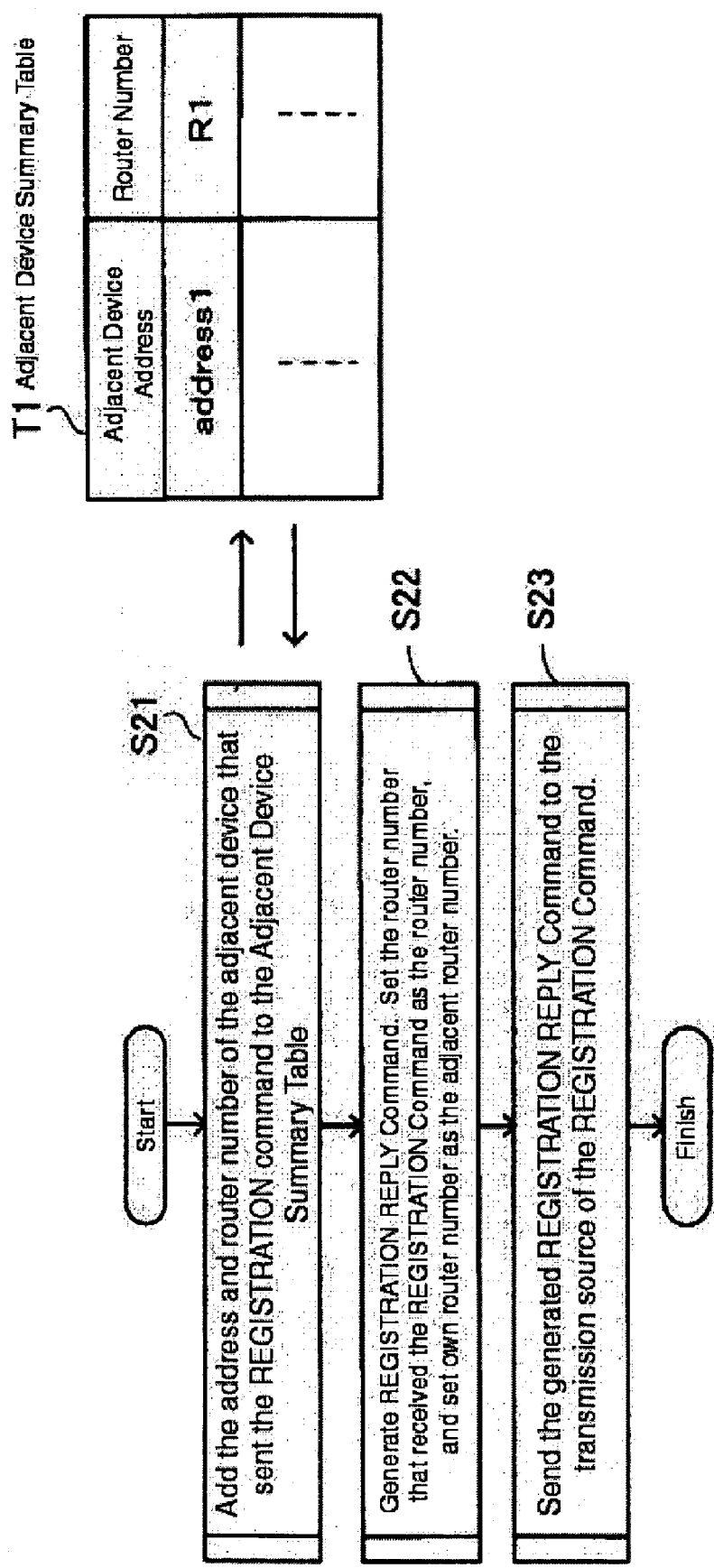
FIG. 17 Flowchart indicating the actions run when the REGISTRATION command is received.

FIG. 17 is a flowchart that indicates actions run when REGISTRATION Command C1 is received. Through REGISTRATION Command C1, Adjacent Device Summary Table T1 is updated.

(S21) When REGISTRATION Command C1 arrives, the adjacent device address and router number noted in the command is added to Adjacent Device Summary Table T1.

(S22) REGISTRATION REPLY Command C2 is created. The router number of the received REGISTRATION Command C1 is set as the router number, and the router number of its own device is set on adjacent router numbers.

(S23) The created REGISTRATION REPLY Command C2 is returned to the transmission source of REGISTRATION Command C1.

Figure 18:
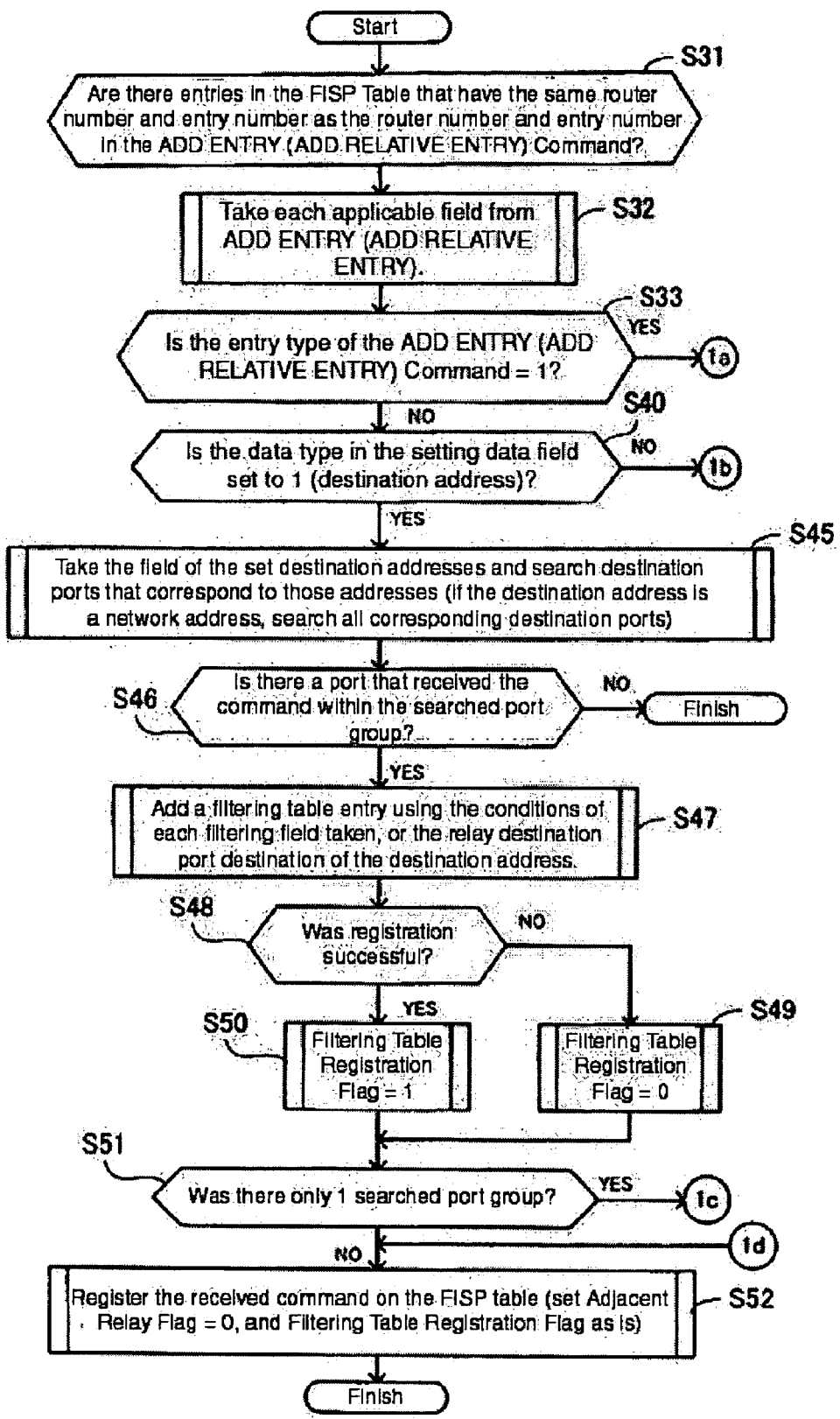
FIG. 18 Flowchart indicating the actions run when the ADD ENTRY command/ADD RELATIVE ENTRY command is received.

FIGS. 18 and 19 are flow charts that indicate actions run when ADD ENTRY Command C5/ADD RELATIVE ENTRY Command C6 are received. Devices for which filtering information was set through external manual settings, etc., will create ADD ENTRY Command C5 and ADD RELATIVE ENTRY Command C6 based on the set information and send to adjacent devices. Devices that receive ADD ENTRY/ADD RELATIVE ENTRY Commands C5 and C6 (abbreviated as "C5" and "C6" below) execute the flow described below.

(S31) It is determined whether the entry with the same router number and entry number as the router number and entry number from the ADD ENTRY/ADD RELATIVE ENTRY Commands C5 and C6 is in Filtering Table T2 or not. If it is in Filtering Table T2, the process is complete (this process avoids multiple registration by doing a multiplicity check of router numbers and entry numbers. In other words, if the same ADD ENTRY/ADD RELATIVE ENTRY Command C5 and C6 are received, an action would disregard that command), if not, go to Step S32.

Also, at this time (when it is not multiple receipts), the received details of Commands C5 and C6 are saved as is onto FISP Table T3. FISP Table T3 consists of the items "Command," "Adjacent Relay Flag," and "Filtering Table Registration Flag."

"Command" sets the relay command details of the received ADD ENTRY/ADD RELATIVE ENTRY Commands C5 and C6 as is (commands that do not require relay are not stored). "Device Relay Flag" is used to determine whether details are to be relayed when entries are deleted, and is set to 1 if the received Commands C5 and C6 are relayed to adjacent devices, or to 0 if they are not relayed (implementing a function to only relay commands that are to be relayed to adjacent devices).

"Filtering Table Registration Flag" is a column that sets a flag that indicates whether or not the registration of Commands C5 and C6 onto a device had actually occurred (in other words, whether they were registered on Filtering Table T2), 0 indicating that registration could not be done due to a filtering function error, etc., and 1 indicates registration. This is used to determine whether it is necessary to delete entries on Filtering Table T2 as well when entries are being deleted (implementing a function that runs only a relay process when registration was not possible due to a filtering function error on a relay device).

(S32) Takes each field that is related to filtering in the ADD ENTRY/ADD RELATIVE ENTRY Commands C5 and C6.

(S33) Determines whether Entry Type in the ADD ENTRY/ADD RELATIVE ENTRY Commands C5 and C6 is 1 (forced sharing) or not. If forced sharing applies, go to S34, if not go to S40.

(S34) Entries are added to Filtering Table T2 using each filtering field condition taken. ADD RELATIVE ENTRY Command C6, is registered to have lower priority than any entries on Filtering Table T2 registered through ADD ENTRY Command C5.

(S35) Determine whether registration was possible or not. If registration was not possible, go to Step S36, if registration was possible go to Step S37.

(S36) Set Filtering Table Registration Flag to 0. Go to Step S38.

(S37) Set Filtering Table Registration Flag to 1.

(S38) Relay the received command as is to all adjacent devices on Adjacent Device Summary Table T1.

(S39) Devices that received the relayed command register that command onto FISP Table T3 (Adjacent Relay Flag is set to 1, Filtering Table Registration Flag uses the same setting as is).

(S40) Determine whether the Data Type in the Setting Data Field has a setting of 1 (destination address present) or not. If it is not set, go to Step S41, if it is set, go to Step S45.

(S41) Add entries to Filtering Table T2 using the conditions taken for the destination port number destination for each filtering field and/or the receiving port as the destination port. ADD RELATIVE ENTRY Command C6 is registered to have lower priority than entries registered on Filtering Table T2 through ADD ENTRY Command C5.

(S42) Determine whether registration was possible or not. If registration was not possible, go to Step S43, and if registration was possible go to Step S44.

(S43) Set Filtering Table Registration Flag to 0. Go to Step S52.

(S44) Set Filtering Table Registration Flag to 1. Go to Step S52.

(S45) Take fields in which destination addresses are set, and look for destination ports that correspond to those addresses. (Look for port numbers to be used when outputting frames to a destination address). If the destination address is a network address, find the corresponding destination port.

(S46) Determine whether ports that received Commands C5 and C6 are present in the group of ports found through Step S45. If they are not present, the process is complete (because its own device will be positioned upstream), if they are present, go to Step S47.

(S47) Add entries to Filtering Table T2 using the conditions of each filtering field take and/or the destination address relay destination port number. ADD RELATIVE ENTRY Command C6 is registered to have lower priority than entries registered on Filtering Table T2 through ADD ENTRY Command C5.

(S48) Determine whether registration was possible or not. If registration was not possible, go to Step S49, and if registration was possible, go to Step S50.

(S49) Set Filtering Table Registration Flag to 0. Go to Step S51.

(S50) Set Filtering Table Registration Flag to 1.

(S51) Determine whether the port group found in Step S45 was 1 port or not. If it was 1 port, go to Step S38, if it was not 1 port, go to Step S52.

(S52) Register the received command onto FISP Table T3 (Adjacent Relay Flag is set to 0, Filtering Table Registration Flag uses the same setting as is).

Here, the general concept of the action flow indicated in FIGS. 18 and 19 shall be explained together. How far to share filtering information becomes important when filtering information sharing is to occur. For a given device, if filtering settings are made to discard all frames from a specific transmission source address, the designated frames will, of course, be discarded as planned when they pass through that device, but designated frames that do not pass through that device must, of course, not be deleted.

FISP shares filtering information, but if sent information is set as is, frames from a specific transmission source address will be discarded on all relay devices. Because of this, if a destination address is not in the command, only the frames that are relayed to an adjacent device that is the transmission source of the command (the device for which the settings were assigned) and match the set filtering information apply for filtering, so filtering registration is done after adding transmission source port information (Step S41).

Also, information can be attained regarding which adjacent devices the frames received by a relay device are to be sent, but since information regarding the next relay device after the next is not normally kept, once the information is received by the adjacent device and sent to the next adjacent device, it cannot be determined whether that next adjacent device should register the filtering information.

Due to this, if a destination address is not present, problems of applying filtering to flow that should not be filtered are avoided by not relaying to an adjacent device unless there are specific instructions to do so (for Steps S42~S44, information is registered but not relayed).

Further, if a destination address is in the command, by having the adjacent device check whether the adjacent device sending information to the destination address will be the same as the port that received the command, a decision can be made as to whether the information shall pass the set device, and registration permissions for Filtering Table T2 are determined through this matching (Step S46).

Also, since registration to Filtering Table T2 on its own device results in the possibility of deciding whether the information shall pass through the set device through the same process even if command details are reported to the next adjacent device, the information will generally be relayed to adjacent devices if it was registered onto Filtering Table T2, but if the command is checked for multiple destination address (destination network) ports and multiples are found, the information will not be relayed to an adjacent device (Step S51, S52).

This is because there are destinations other than the port that received the command included in the setting address of the filtering information, so frames to those destinations are not filtered.

This matter shall be explained through the network in FIG. 15. Let us imagine that settings were assigned to discard frames with the destination address 10.1/16 on Relay Device 10-1, in order to assign settings to discard frames sent to Subnet 5-1 and Subnet 5-4 through Relay Device 10-1.

Relay Device 10-1 sends information to Relay Device 10-2 through ADD ENTRY/ADD RELATIVE ENTRY, indicating to discard frames with the destination address 10.1/16, and Relay Device 10-2, upon receiving this information, registers onto its filtering table to discard frames with the destination 10.1/16 and have transmission port P2a.

Here, if Relay Device 10-2 relays this information all the way to Relay Device 10-4, settings to discard frames with the destination 10.1/16 and transmission port P4a are similarly assigned to Relay Device 10-4.

Due to this, regardless of communication between Computer Terminal 23 and Server 30-2 not passing through Relay Device 10-1, frames are caught on the filtering table and are deleted. Multiple ports are identified to prevent this problem from occurring, and if the actual action flow is followed, the filtering information sent to Relay Device 10-2 will be registered onto the filtering table of Relay Device 10-2, but this information will not be relayed to Relay Device 10-4.

Because of this, access from Computer Terminal 23 to Server 30-2 crosses from Relay Device 10-4 to Relay Device 10-2, and frames will not be caught by the filtering table on Relay Device 10-2 because the transmission port is P2b, and they will be relayed. In other words, it becomes possible to prevent the problem of frames being discarded even if they do not pass through Relay Device 10-1.

Since access from Computer Terminal 23 to Server 30-1 passes through Relay Device 10-1, frames will be caught by the filtering table on Relay Device 10-2, and shall be properly discarded as planned (since frames are discarded on Relay Device 10-2 that precedes Relay Device 10-1 and thus are not relayed to, Relay Device 10-1, excess network load does not occur either).

Figure 20:
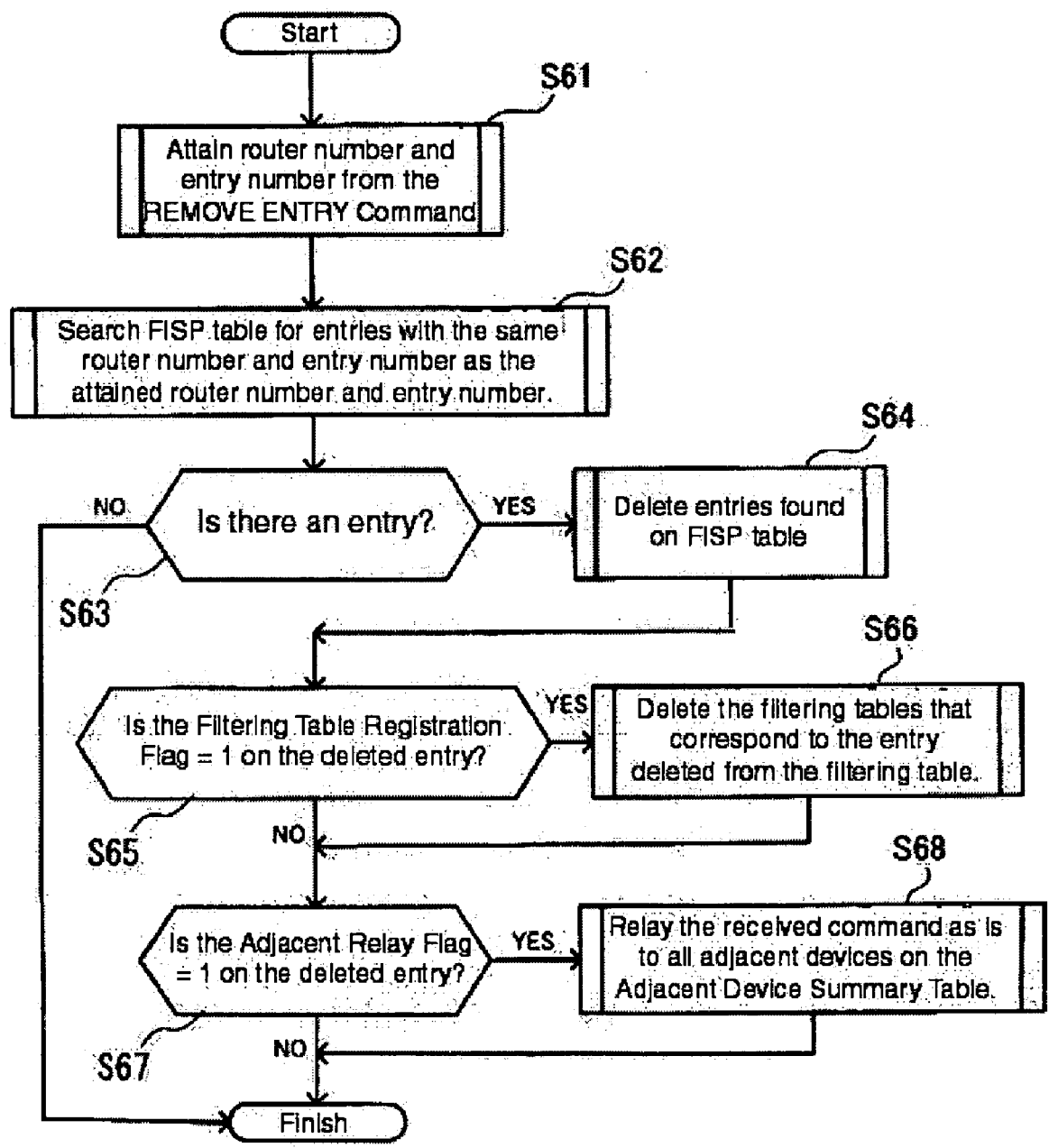
FIG. 20 Flowchart indicating actions run when the REMOVE ENTRY command is received.

FIG. 20 is a flowchart indicating the actions that occur when REMOVE ENTRY Command C7 is received. REMOVE ENTRY Command C7 is created by a relay device when set filtering information is deleted, and sent to adjacent devices.

(S61) Attain REMOVE ENTRY Command C7 router number and entry number.

(S62) Search FISP Table T3 for entries with the same router number and entry number as the router
number and entry number attained.

(S63) Judge destination addresses that have entries. If present go to step S64, if not present the process is complete.

(S64) Delete found entry from FISP Table T3.

(S65) Determine whether the deleted entry's Filtering Table Registration Flag is 1 or not. If 1 go to Step S66, if 0 go to Step S67.

(S66) Delete filtering entries that support the entries deleted from Filtering Table T2.

(S67) Determine whether the deleted entry's Adjacent Relay Flag is 1 or not. If 1 go to Step S68, if 0 the process is complete.

(S68) Relay the received command to all adjacent devices on the Adjacent Device Summary Table 1.

In this manner, when REMOVE ENTRY Command C7 is received, entries are deleted from FISP Table T3 by searching details for the unique router number and entry number sent with each command. FISP Table T3 also has information regarding Filtering Table Registration Flags and Adjacent Relay Flags, so the necessity of deleting entries from Filtering Table T2 and the necessity of relaying the received information can be determined.

Figure 21:
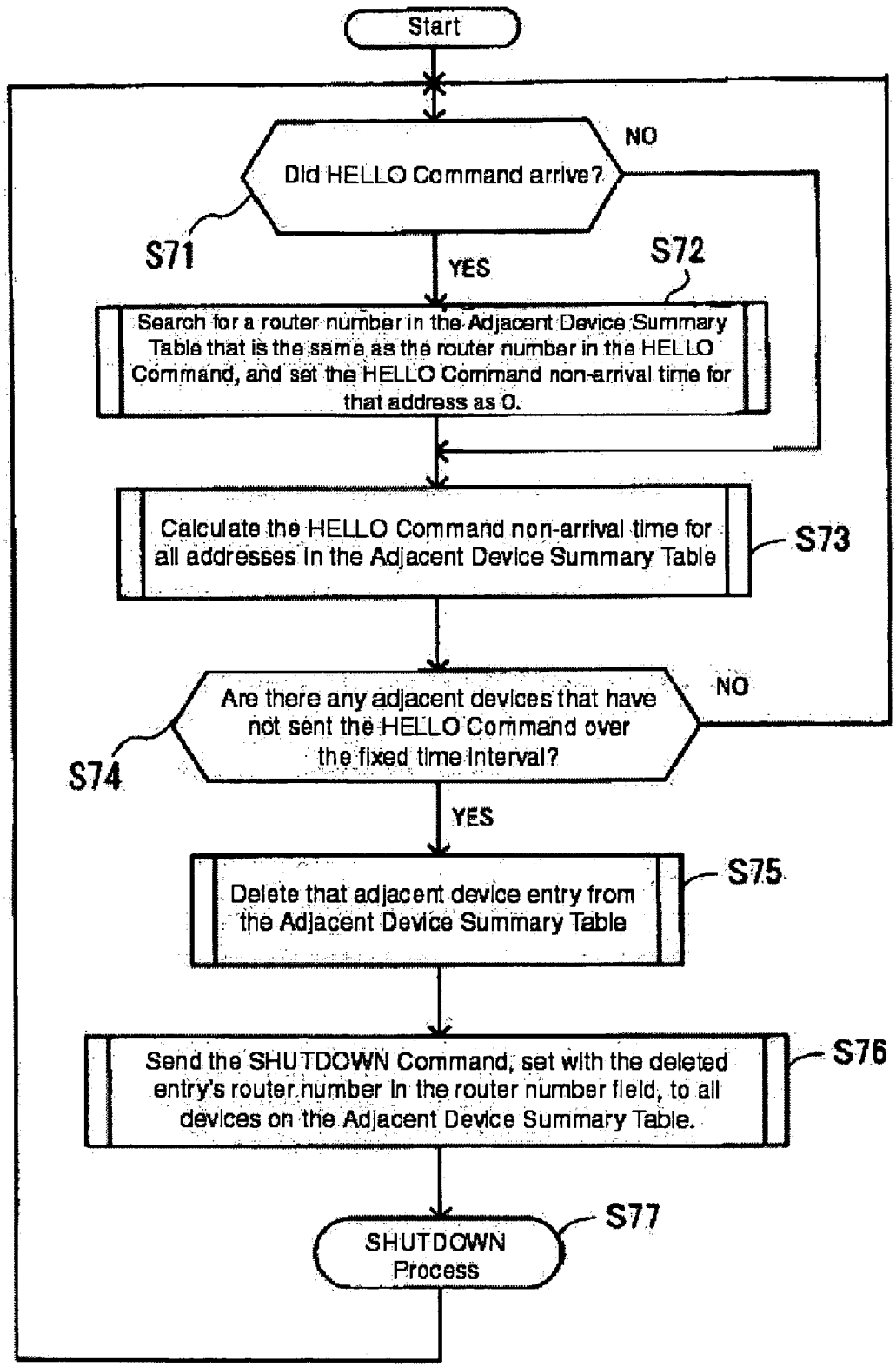
FIG. 21 Flowchart indicating the actions regularly run during FISP startup.

FIG. 21 is a flow chart indicating the actions that normally run when FISP is operational. It indicates the actions of HELLO Command C3, which confirms whether adjacent devices are live or dead.

(S71) Determine whether HELLO Command C3 has arrived. If Yes go to Step S72, if No go to Step S73.

(S72) Search Adjacent Device Summary Table T1 for the same router number as the router number from HELLO Command C3, and make the HELLO Command C3 for that address have the non-arrival time of 0.

(S73) Non-arrival time for HELLO Command C3 is calculated for all addresses on Adjacent Device Summary Table T1.

(S74) Determine if there are adjacent devices that have exceeded the designated time to send HELLO Command C3. If there are, go to Step S75, if there are not, go to Step S71.

(S75) Remove that adjacent device's entries from Adjacent Device Summary Table T1.

(S76) Set the deleted entry's router number in the SHUTDOWN Command C4 router number field, and send SHUTDOWN Command C4 to all addresses on Adjacent Device Summary Table T1.

Figure 22:
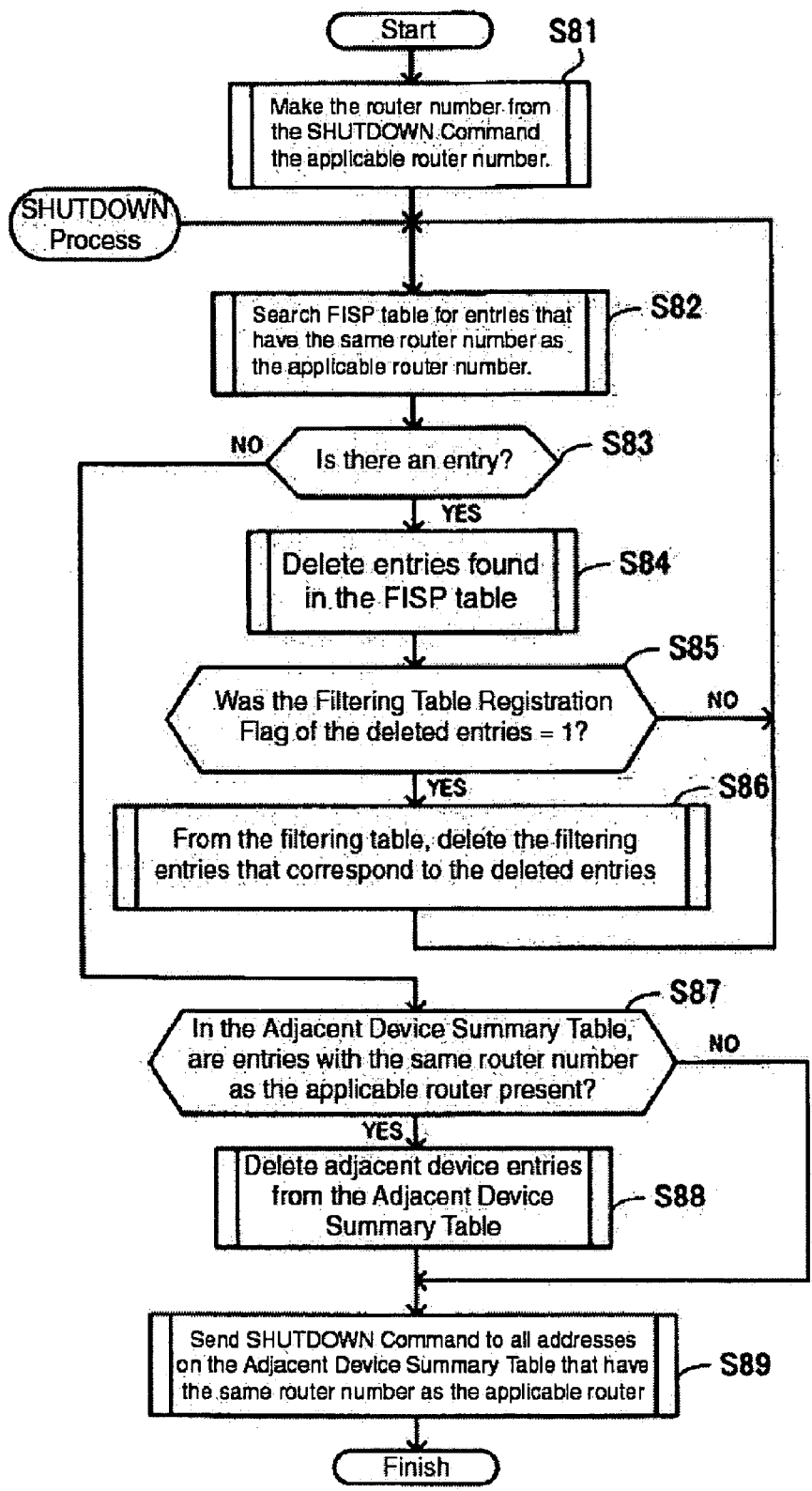
FIG. 22 Flowchart indicating the actions run when the SHUTDOWN command is received, or when an adjacent device has stopped.
Figure 23:
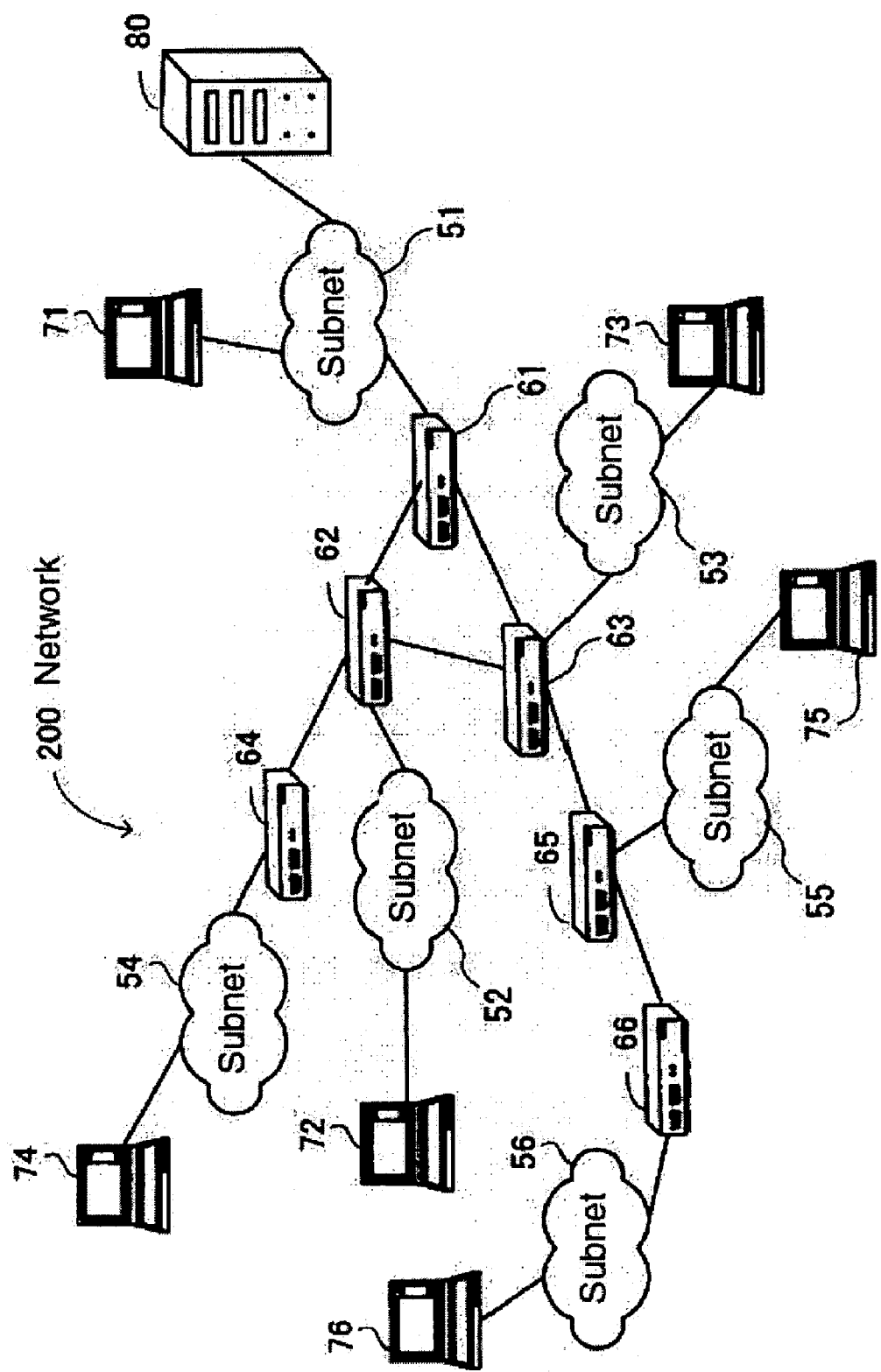
FIG. 23 Figure indicating a sample network in order to explain current filtering problems.

(S77) Run SHUTDOWN Process (See FIG. 22). Return to Step S71.

Here, the transmission interval time for HELLO Command C3 is defined to 30 seconds by default, but can be changed to any value if it is unique to the network. Also, the aforementioned action flow applies to all adjacent devices, calculates the non-arrival time of HELLO Command C3, decides that an adjacent device has stopped if HELLO Command C3 does not arrive within a set period of time, and sends SHUTDOWN Command C4 using the adjacent device router number.

FIG. 22 is a flowchart indicating the actions run when SHUTDOWN Command C4 is received or when the termination of adjacent devices is accepted.

(S81) Set the applicable router number as the router number in SHUTDOWN Command C4.

(S82) Search for FISP Table T3 entries that have the same router number as the applicable router number.

(S83) Determine whether the entry exists. If it exists, go to Step S84, if not go to Step S87.

(S84) Delete entries found in FISP Table T3.

(S85) Determine whether the deleted entry's Filtering Table Registration Flag is 1. If 1, go to Step S86, if 0, go to Step S82.

(S86) Delete from Filtering Table T2 the filtering entries that correspond to the deleted entry.

(S87) Determine whether there are entries in Adjacent Device Summary Table T1 with the same router
number as the corresponding router. If there is, go to Step S88, if not go to Step S89.

(S88) Delete adjacent device entries from Adjacent Device Summary Table T1.

(S89) Send SHUTDOWN Command C4 with the applicable router number as its router number to all addresses on Adjacent Device Summary Table T1.

In the above mentioned action flow, "Start" means the start position when the SHUTDOWN Command C4 is received, and "SHUTDOWN Process" means the start position of Step S77 on FIG. 21. The time of SHUTDOWN requires that all filtering information registered by router number is deleted, and the process is carried out so that entries are deleted in sequence only by router number.

Also, SHUTDOWN Command C4 is reported to all devices by relaying information to adjacent devices after the deletion process is completed through SHUTDOWN Command C4. Here, if a device has received SHUTDOWN Command C4 once already, entries with the corresponding router number on Adjacent Device Summary Table T1 are deleted, so even if the same SHUTDOWN Command C4 is received multiple times from adjacent devices, a repeat relay process for SHUTDOWN Command C4 does not run. Through this, an error in which SHUTDOWN Command C4 is sent repeatedly forever does not occur.

As explained above, this invention is structured so that when filtering information sharing is implemented, if the filtering information has a destination address, and if the relay destination port of the destination address matches the receiving port of the filtering information, the filtering information is registered onto its own device and relayed to adjacent devices, but if the filtering information does not have destination address information, the receiving port of the filtering information becomes also the destination address port, and the device registers itself and does not relay filtering information.

Regarding network structure, for current networks, settings for priority protocol are considered prior to structuring the network, and procedures and processes are also considered if the structure is to be changed, but filtering information is not a point that is considered when structuring a network, and is often suddenly set up when a security problem occurs. Due to this fact, unified filtering management becomes difficult as settings increase, and changes made when the network structure is to be changed become very tedious.

This invention, in addition to eliminating tedious management by sharing filtering between relay devices, completely solves the problem of frames being filtered when they are not meant to be filtered.

Servers that support service on the network currently frequently set up access permissions lists, but these settings are only run within the server, so when the server's load is increased, the load requiring filtering also increases a great deal, causing problems in which the regular information transferring services would no longer run. In addition, there were also problems in which excess frames (frames that were to be discarded through filtering) flowing through the network would obstruct other communications.

Since this invention shares filtering information through the entire network by connecting to the server access list and sending out FISP commands with filtering information to adjacent devices, the filtering is applied on the relay devices, and so the server's overall load can be distributed to the service itself. On top of this, by setting up filtering on an entire network, packets that are to be discarded through filtering are discarded at the network entrance, and so the flow of excess frames into the network is prevented, avoiding any problems causing disruption to the other communications.

Even for network monitoring devices, this invention is structured so that FISP Commands are generated according to filtering information set up externally, and so that commands are sent to adjacent relay devices, allowing filtering information to be shared and cancelled together on the entire network with operation monitoring in place. Through this, operation management becomes more efficient.

In the above-mentioned explanation for this invention focused on a scenario using relay devices with FISP Functions, but it is also possible to share server and/or network monitoring device filtering information between devices other than relay devices, such as servers and network monitoring devices, or to substitute relay devices for servers for filtering processes.

Also, if FISP functions are used on servers and/or network monitoring devices, the servers and/or network monitoring devices themselves would not require registration of filtering information from adjacent devices, and should mainly carry out functions such as the Startup Process in FIG. 16, the Registration Process in FIG. 17, Standard Actions in FIG. 21, and the SHUTDOWN Process in FIG. 22.

In addition, it is not necessary for FISP entries from adjacent devices to be relayed or stored, and so the search process and deletion process on the FISP table during the SHUTDOWN Process in FIG. 22 is also not necessary (there is no need to even have a FISP table).

However, for servers, it is alternatively necessary to have a structure that connects to the service supported by the server and can transmit ADD ENTRY/ADD RELATIVE ENTRY Commands, with a process than can generate and transmit commands from the filtering information set on the service. Further, if filtering information is shared between relay devices as a set on the network monitoring device, if the set filtering information is to be deleted later, it is possible to delete the entire set using the REMOVE ENTRY Command.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A network system comprising:
   a transmission medium coupling a plurality of devices on the network;
   a plurality of relay devices connected to the transmission medium, each relay device operable to apply filtering on data from the network and transmits frames, each relay device comprising:
   command process division operable to:
      generate and parse commands that include filtering information relating the sharing of filtering information on the network, and when filtering sharing conditions are applied,
      register filtering information on its own device and apply a protocol to relay to an adjacent device if filtering information sent from an adjacent device through the filtering sharing conditions has a destination address, if a port that received the filtering information from the adjacent matches a relay destination port of the destination address, and if there is only one relay destination port for the destination address,
      register a receiving port of the filtering information as a destination port, if there is no destination address information in the filtering information sent from the adjacent device through the filtering sharing conditions, and
   a filtering information sharing protocol division operable to apply a protocol so that filtering information is not relayed to an adjacent device; and
   a filtering division operable to relay filtering information and frames, or filters discarded information, based on instruction from the filtering information sharing protocol division.

2. The network system according to claim 1, further comprising a filtering sharing control division operable to relay and register filtering information by force, if filtering sharing conditions do not apply.

3. The network system according to claim 1, wherein the filtering sharing control division is further operable to not relay filtering information, if device-specific information is included in the filtering information.

4. The network system according to claim 1, wherein the filtering sharing control division is further operable to generate commands with secondary filtering information related to the filtering information, and registering the secondary filtering information as having lower priority than the filtering information.

5. The network system according to claim 1, wherein the filtering sharing control division is further operable to send deletion commands to adjacent devices, if shared filtering information is deleted through an external designation.

6. The network system according to claim 1, wherein the filtering sharing control division is further operable to send a command to regularly check operation of an adjacent device, and report a stopped adjacent device to other adjacent devices if an adjacent device's operation cannot be confirmed.

7. The network system according to claim 1, wherein the filtering sharing control division is further operable to discard received filtering information, if the information sent from an adjacent device has already been received.

8. The network system according to claim 1, wherein the filtering sharing control division is further operable to carry out the relay protocol to only adjacent devices according to relay conditions, without registration, if designated filtering information cannot be registered.

9. The network system according to claim 1, wherein the filtering sharing control division is further operable to, on the occasion that its own device stops, report to adjacent devices that the device has stopped, or relay a stop report to adjacent devices if a stop report is received, and discard all filtering information set on the stopped device.

10. The network system according to claim 1, further comprising a server device operable to generates commands including filtering information, sending the commands to adjacent relay devices, and running filtering processes on network traffic relating to access to the server device.

11. The network system according to claim 1, further comprising a network monitoring device operable to generate commands based on externally set filtering information, sending the commands to adjacent relay devices, and sharing and/or removing sets of filtering information pertaining to operation monitoring on the entire network.

12. A relay device for a network system for applying filtering on a network and transmitting frames, the relay device comprising:
a command process division operable to:
generate and parse commands that include filtering information relating the sharing of filtering information on the network, and when filtering sharing conditions are applied,
register filtering information on its own device and apply a protocol to relay to an adjacent device if filtering information sent from an adjacent device through the filtering sharing conditions has a destination address, if a port that received the filtering information from the adjacent matches a relay destination port of the destination address, and if there is only one relay destination port for the destination address,
register a receiving port of the filtering information as a destination port, if there is no destination address information in the filtering information sent from the adjacent device through the filtering sharing conditions, and
a filtering information sharing protocol division operable to apply a protocol so that filtering information is not relayed to an adjacent device; and
a filtering division operable to relay filtering information and frames, or filters discarded information, based on instruction from the filtering information sharing protocol division.

13. The network system according to claim 1, further comprising a filtering sharing control division operable to relay and register filtering information by force, if filtering sharing conditions do not apply.

14. The network system according to claim 1, wherein the filtering sharing control division is further operable to not relay filtering information, if device-specific information is included in the filtering information.

15. The network system according to claim 1, wherein the filtering sharing control division is further operable to generate commands with secondary filtering information related to the filtering information, and registering the secondary filtering information as having lower priority than the filtering information.

16. The network system according to claim 1, wherein the filtering sharing control division is further operable to send deletion commands to adjacent devices, if shared filtering information is deleted through an external designation.

17. The network system according to claim 1, wherein the filtering sharing control division is further operable to send a command to regularly check operation of an adjacent device, and report a stopped adjacent device to other adjacent devices if an adjacent device's operation cannot be confirmed.

18. The network system according to claim 1, wherein the filtering sharing control division is further operable to discard received filtering information, if the information sent from an adjacent device has already been received.

19. The network system according to claim 1, wherein the filtering sharing control division is further operable to carry out the relay protocol to only adjacent devices according to relay conditions, without registration, if designated filtering information cannot be registered.

20. The network system according to claim 1, wherein the filtering sharing control division is further operable to, on the occasion that its own device stops, report to adjacent devices that the device has stopped, or relay a stop report to adjacent devices if a stop report is received, and discard all filtering information set on the stopped device.

21. A method of filtering information sharing for filtering frames on a network comprising the steps of:
sharing filtering information on the network by having devices connected to the network report filtering information set on a device to adjacent devices;
having a device that received the report set its own filtering information based on the received filtering information and transmit the report to other adjacent devices;
registering the filtering information on the device and applying a protocol to relay the filtering information to an adjacent device when filtering sharing conditions are applied, if the filtering information received from an adjacent device through the filtering sharing conditions has a destination address, the port that received the filtering information matches a relay destination port of the destination address, and there is only one relay destination port for the destination address; and
applying a protocol so that the filtering information is not relayed to an adjacent device, if the filtering information received from an adjacent device through the filtering sharing conditions does not have a destination address, of the port that received the filtering information does not match a relay destination port of the destination address.

22. The method according to claim 21, further comprising the step of relaying and registering filtering information by force, if filtering sharing conditions do not apply.

23. The method according to claim 21, further comprising the step of not relaying filtering information, if device-specific information is included in the filtering information.

24. The method according to claim 21, further comprising the step of generating commands with secondary filtering information related to the filtering information, and registering the secondary filtering information as having lower priority than the filtering information.

25. The method according to claim 21, further comprising the step of sending deletion commands to adjacent devices, if shared filtering information is deleted through an external designation.

26. The method according to claim 21, further comprising the step of sending a command to regularly check operation of an adjacent device, and report a stopped adjacent device to other adjacent devices if an adjacent device's operation cannot be confirmed.

27. The method according to claim 21, further comprising the step of discarding received filtering information, if the information sent from an adjacent device has already been received.

28. The method according to claim 21, further comprising the step of carrying out the relay protocol to only adjacent devices according to relay conditions, without registration, if designated filtering information cannot be registered.

29. The method according to claim 21, further comprising the step of, on the occasion that its own device stops, reporting to adjacent devices that the device has stopped, or relaying a stop report to adjacent devices if a stop report is received, and discarding all filtering information set on the stopped device.

30. The method according to claim 21, further comprising the step of generating commands including filtering information, sending the commands to adjacent relay devices, and running filtering processes on network traffic relating to access to the server device.

31. The method according to claim 21, further comprising the step of generating commands based on externally set filtering information, sending the commands to adjacent relay devices, and sharing and/or removing sets of filtering information pertaining to operation monitoring on the entire network.

* * * * *